US012696195B2

(12) United States Patent (10) Patent No.: US 12,696,195 B2
Kang et al. (45) Date of Patent: Jul. 28, 2026

(54) ELECTRONIC DEVICE AND OPERATION METHOD THEREFOR

(71) Applicant: SAMSUNG ELECTRONICS CO., LTD., Suwon-si (KR)

(72) Inventors: Kunsok Kang, Suwon-si (KR); Eungsik Yoon, Suwon-si (KR); Byungseok Soh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 351 days.

(21) Appl. No.: 18/314,326

(22) Filed: May 9, 2023

(65) Prior Publication Data

US 2023/0319724 A1 Oct. 5, 2023

Related U.S. Application Data

(63) Continuation of application No. PCT/KR2021/013216, filed on Sep. 28, 2021.

(30) Foreign Application Priority Data

Nov. 10, 2020 (KR) ........................ 10-2020-0149595

(51) Int. Cl.
*H04W 52/28* (2009.01)
*H04W 8/00* (2009.01)
*H04W 52/02* (2009.01)

(52) U.S. Cl.
CPC ......... *H04W 52/028* (2013.01); *H04W 8/005* (2013.01)

(58) Field of Classification Search
CPC ... H04W 52/028; H04W 8/005; H04W 4/023; H04W 4/026; H04W 4/027; H04W 4/33;

H04W 52/0245; H04W 52/0254; H04W 52/0229; H04W 88/06; H04W 4/80;
(Continued)

(56) References Cited

U.S. PATENT DOCUMENTS 5,969,641 A * 10/1999 Nakamura ........... G07B 15/063
340/928
9,571,974 B2 2/2017 Choi et al.
9,641,662 B2 5/2017 Houjou et al.
(Continued)

FOREIGN PATENT DOCUMENTS

CN 110972063 A 4/2020
KR 20120056698 A 6/2012
(Continued)

OTHER PUBLICATIONS

Korean Office Action dated Jan. 14, 2025 for KR Application No. 10-2020-0149595.
(Continued)

*Primary Examiner* — Steven Hieu D Nguyen
(74) *Attorney, Agent, or Firm* — Nixon & Vanderhye P.C.

(57) ABSTRACT

An operation method of an electronic device may include searching for a user terminal by using a first communication method in a sleep mode, performing, in response to discovery of the user terminal, pairing with the user terminal by using a second communication method, identifying whether a first event occurs in the user terminal by using the second communication method, and switching from the sleep mode to a normal mode when identifying that the first event has occurred in the user terminal.

18 Claims, 17 Drawing Sheets

(58) Field of Classification Search
CPC ............. H04W 76/14; H04M 1/72412; H04M
2250/02; Y02D 30/70
See application file for complete search history.

(56) References Cited

U.S. PATENT DOCUMENTS

| | | | |
|---|---|---|---|
| 9,769,686 | B2 | 9/2017 | Kang et al. |
| 9,769,757 | B2 | 9/2017 | Suh et al. |
| 10,015,739 | B2 | 7/2018 | Yoon et al. |
| 10,459,511 | B2 | 10/2019 | Lee et al. |
| 11,523,341 | B2 | 12/2022 | Yoon et al. |
| 2014/0221051 | A1 | 8/2014 | Oguri |
| 2016/0119962 | A1 | 4/2016 | Kim et al. |
| 2016/0150472 | A1 | 5/2016 | Yoon et al. |
| 2016/0219433 | A1* | 7/2016 | Naruse .................... H04N 1/00 |
| 2016/0227596 | A1* | 8/2016 | Otani ................ H04N 1/00204 |
| 2016/0350058 | A1 | 12/2016 | Zhu et al. |
| 2017/0013401 | A1 | 1/2017 | Jonsson |
| 2017/0180918 | A1 | 6/2017 | Yang et al. |
| 2017/0215030 | A1* | 7/2017 | Choi ....................... H04W 4/80 |
| 2018/0113654 | A1* | 4/2018 | Yeung .................... H04W 4/80 |
| 2018/0270604 | A1* | 9/2018 | Yanagi ................... G01S 19/48 |
| 2018/0338286 | A1 | 11/2018 | Hariharan et al. |
| 2019/0166490 | A1* | 5/2019 | Lee ....................... H04W 84/18 |
| 2020/0106877 | A1* | 4/2020 | Ledvina ................ H04W 12/06 |
| 2020/0279036 | A1 | 9/2020 | Ulrich et al. |
| 2021/0072373 | A1* | 3/2021 | Schoenberg .......... G01S 13/878 |
| 2021/0076434 | A1* | 3/2021 | Hariharan ............. H04W 76/14 |

FOREIGN PATENT DOCUMENTS

| | | | |
|---|---|---|---|
| KR | 20140080416 | A | 6/2014 |
| KR | 20160046340 | A | 4/2016 |
| KR | 20160060972 | A | 5/2016 |
| KR | 20170073257 | A | 6/2017 |
| KR | 102022666 | B1 | 9/2019 |
| KR | 102092915 | B1 | 3/2020 |
| KR | 20200022040 | A | 3/2020 |

OTHER PUBLICATIONS

Extended European Search Report dated Mar. 11, 2024 for EP Application No. 21892127.8.
International Search Report for PCT/KR2021/013216 mailed Jan. 6, 2022, 12 pages.
European Notice of Allowance dated May 23, 2025 for EP Application No. 21892127.8.

* cited by examiner

ELECTRONIC DEVICE AND OPERATION METHOD THEREFOR

CROSS-REFERENCE TO RELATED APPLICATIONS

This application is a continuation of International Application No. PCT/KR2021/013216, filed on Sep. 28, 2021, designating the U.S., in the Korean Intellectual Property Receiving Office, and claiming priority to KR 10-2020-0149595, filed Nov. 10, 2020, the disclosures of which are all hereby incorporated by reference herein in their entireties.

BACKGROUND

Field

Various example embodiments relate to an electronic device and/or an operation method thereof, and for example, to an electronic device for detecting an event that occurs in a user terminal by using wireless communication and operating according to the event, and/or an operation method of the electronic device.

Description of Related Art

Bluetooth is a standard for transmitting and receiving data over a 2.4 gigahertz (GHz) wireless link. Among Bluetooth standards, Bluetooth Low Energy (BLE) is Bluetooth having Bluetooth 4.0 (Bluetooth Smart) specifications, and has an advantage of significantly lower power consumption than conventional Bluetooth. The electronic device may periodically transmit a scan signal using BLE communication to sense nearby devices around it or the like with low power.

In some cases, a user may want to perform wireless communication only with a nearby device located in a same space as the electronic device. However, because the BLE technology is used to scan for nearby devices by taking into account only a signal strength, the BLE allows detection of nearby devices located within a predetermined range from an electronic device but is not capable of selectively scanning only for nearby devices located in the same space as the electronic device. For example, because a nearby device may be found even when it is not located in the same space as the electronic device, e.g., in the same house, or even when it is located in a closed space, such as a room, in the same house, the user may not selectively perform wireless communication only with a nearby device located in the same space.

SUMMARY

According to an example embodiment, an operation method of an electronic device may include searching for a user terminal by using a first communication method in a sleep mode, performing, in response to discovery of the user terminal, pairing with the user terminal by using a second communication method, identifying whether a first event occurs in the user terminal by using the second communication method, and switching from the sleep mode to a normal mode when identifying that the first event has occurred in the user terminal.

BRIEF DESCRIPTION OF DRAWINGS

The above and other aspects, features, and advantages of certain example embodiments will be more apparent from the following detailed description, taken in conjunction with the accompanying drawings, in which:

FIG. 2 is a diagram illustrating a case in which an electronic device and a user terminal are connected via a plurality of wireless networks, according to an example embodiment.

FIG. 5 is a diagram for describing an electronic device equipped with an ultra-wideband (UWB) communication module, according to an example embodiment.

DETAILED DESCRIPTION

Figure 1:
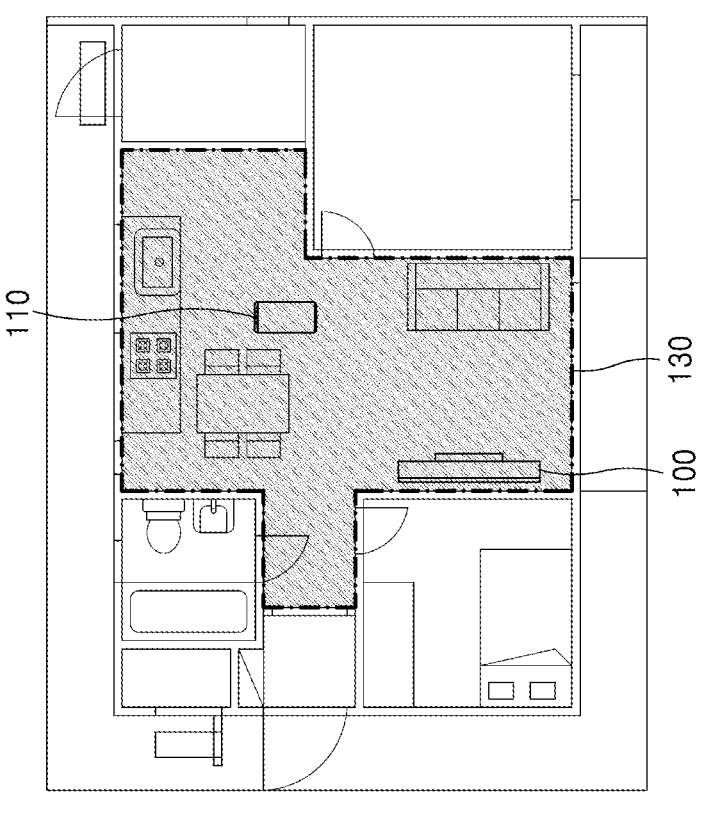
FIG. 1 is a diagram for describing a case in which an electronic device detects a user terminal by using a plurality of communication methods, according to an example embodiment.
Figure 1:
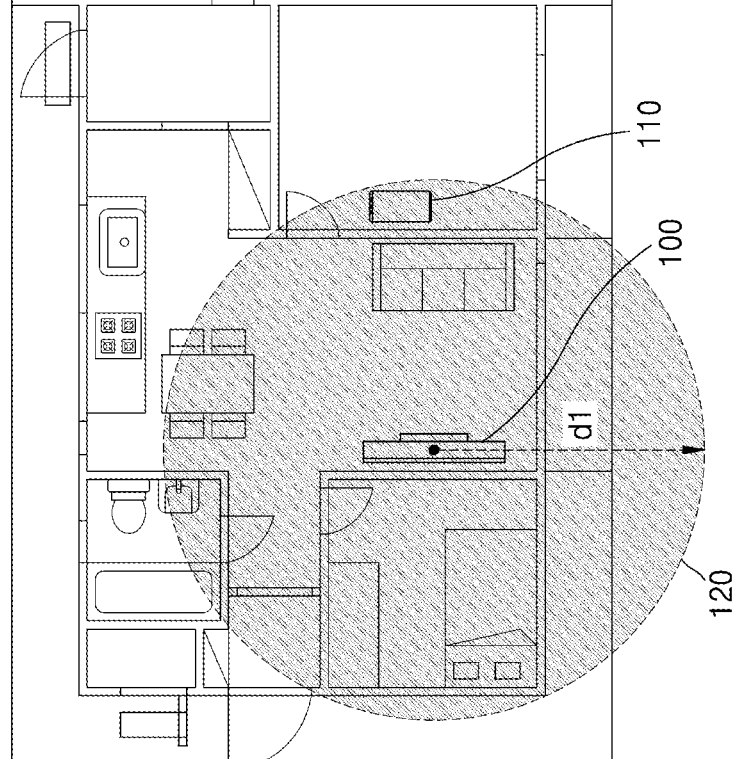

In an example embodiment, the first communication method is a Bluetooth Low Energy (BLE) communication method, and the second communication method is an ultra-wideband (UWB) communication method.

In an example embodiment, the electronic device may include a UWB communication module including a plurality of antennas, the plurality of antennas may include at least two receive (RX) antennas and at least one transmit (TX)/RX antenna, and at least one antenna may be arranged in vertical and horizontal directions on a front side of a display of the electronic device to detect at least one of a location and a direction of the user terminal.

In an example embodiment, the operation method may further include identifying whether a third event occurs in the user terminal in the normal mode and identifying that the third event has occurred in the user terminal and switching from the normal mode to the sleep mode when no event is detected for a certain period of time after the occurrence of the third event, and the third event may include a case where a strength of a signal received from the user terminal via the plurality of antennas included in the UWB communication module is less than or equal to a certain reference value.

In an example embodiment, the operation method may further include identifying whether a second event occurs in the user terminal in the normal mode, and when identifying that the second event has occurred in the user terminal, outputting, onto the display, an interface screen for performing an interaction with the user terminal.

In an example embodiment, at least one of the first event and the second event may include at least one of a change in a strength of a signal received from the user terminal via the plurality of antennas included in the UWB communication module and a change in the direction of the user terminal.

In an example embodiment, the sleep mode may include a first sleep mode and a second sleep mode, the searching for the user terminal by using the first communication method may be performed in the first sleep mode, the performing of the pairing with the user terminal by using the second communication method may be performed in the second sleep mode, and the operation method may further include, after the performing of the pairing, switching a mode of the electronic device from the second sleep mode to the first sleep mode when the electronic device fails to identify that the first event has occurred in the user terminal for a certain period of time.

According to an example embodiment, an operation method of a user terminal may include searching for an electronic device by using a first communication method in a sleep mode, performing, in response to discovery of the electronic device, pairing with the electronic device by using a second communication method, and switching from the sleep mode to a normal mode when detecting that a fourth event occurs in the user terminal in the sleep mode.

In an example embodiment, the user terminal may include at least one of an illuminance sensor, a magnetic sensor, a gyroscope sensor, a position sensor, a proximity sensor, and an acceleration sensor, and the detecting of the fourth event may include detecting whether the fourth event has occurred by using at least one of the sensors.

In an example embodiment, the fourth event may include at least one of a change in illuminance of surroundings of the user terminal, a change in a distance between the user terminal and the electronic device, a change in a direction of the user terminal, and a change in acceleration of the user terminal.

According to an example embodiment, an electronic device may include a processor and a communicator including a first communication module and a second communication module, the communication and the communication modules each comprising communication circuitry, and wherein the processor and/or the communicator may, in a sleep mode, search for a user terminal by using the first communication module, perform, in response to discovery of the user terminal, pairing with the user terminal by using the second communication module, and identify whether a first event occurs in the user terminal by using the second communication module, and when the communicator identifies that the first event has occurred in the user terminal, the electronic device may switch from the sleep mode to the normal mode.

According to an example embodiment, a user terminal may include a sensor unit including at least one of an illuminance sensor, a magnetic sensor, a gyroscope sensor, a position sensor, a proximity sensor, and an acceleration sensor, a display, a processor, and a communicator including a first communication module and a second communication module, the communicator may, in a sleep mode, search for an electronic device by using the first communication module and perform, in response to discovery of the electronic device, pairing with the electronic device by using the second communication module, and when the sensor unit senses that a fourth event has occurred in the user terminal, the user terminal may switch from the sleep mode to a normal mode.

According to an example embodiment, a computer-readable recording medium may have recorded thereon a program for implementing an operation method of an electronic device, the operation method including searching for a user terminal by using a first communication method in a sleep mode, performing, in response to discovery of the user terminal, pairing with the user terminal by using a second communication method, identifying whether a first event occurs in the user terminal by using the second communication method, and switching from the sleep mode to a normal mode when identifying that the first event has occurred in the user terminal.

Example embodiments will be described more fully hereinafter with reference to the accompanying drawings so that they may be easily implemented by one of ordinary skill in the art. However, the present disclosure may have different forms and should not be construed as being limited to embodiments set forth herein.

The terminology used in the present disclosure is described as a general term currently used in the art based on functions described in the present disclosure, but it may mean various other terms according to an intention of a technician engaged in the art, precedent cases, advent of new technologies, etc. Thus, the terms used herein should be defined not by simple appellations thereof but based on the meaning of the terms together with the overall description of the present disclosure. "Based on" as used herein covers based at least on.

In addition, the terms used herein are only used to describe particular embodiments, and are not intended to limit the present disclosure.

Throughout the specification, it will be understood that when a part is referred to as being "connected" or "coupled" to another part, it may be "directly connected" to or "electrically coupled" to the other part with one or more intervening elements therebetween.

The use of the terms "the" and similar referents used in the specification, especially in the following claims, are to be construed to cover both the singular and the plural. Furthermore, operations of a method according to the present disclosure described herein may be performed in any suitable order unless clearly specified herein. The present disclosure is not limited to the described order of the operations.

Expressions such as "in some embodiments" or "in an embodiment" described in various parts of this specification do not necessarily refer to the same embodiment(s).

Some example embodiments may be described in terms of functional block components and various processing operations. Some or all of such functional blocks may be implemented by any number of hardware and/or software components that execute specific functions. For example, functional blocks of the present disclosure may be implemented by one or more microprocessors or by circuit components for performing certain functions. Furthermore, functional blocks according to the present disclosure may be implemented with various programming or scripting languages. The functional blocks may be implemented using various algorithms executed on one or more processors. Furthermore, the present disclosure may employ techniques of the related art for electronics configuration, signal processing, and/or data processing. The terms such as "mechanism", "element", "means", and "construction" may be used in a broad sense and are not limited to mechanical or physical components.

Furthermore, connecting lines or connectors shown in various figures are intended to represent exemplary functional connections and/or physical or logical couplings between components in the figures. In an actual device, connections between components may be represented by many alternative or additional functional relationships, physical connections, or logical connections.

As used herein, the term "unit" or "module" indicates a unit for processing at least one function or operation and may be implemented using hardware or software or a combination of hardware and software. Thus, each "module" herein may comprise circuitry.

In addition, in the specification, the term "user" refers to a person who controls a function or operation of an electronic device and/or a user terminal by using the electronic device and/or the user terminal, and may include a viewer, a consumer, an administrator, or an installation engineer.

Hereinafter, examples of the present disclosure will be described in detail with reference to the accompanying drawings.

FIG. 1 is a diagram for describing a case in which an electronic device 100 detects a user terminal 110 by using a plurality of communication methods, according to an embodiment.

In an embodiment, the electronic device 100 may be a device capable of scanning for and communicating with a nearby device. In an embodiment, the electronic device 100 may include a plurality of communication modules. In an embodiment, the electronic device 100 may include a Bluetooth Low Energy (BLE) communication module for performing a BLE communication method and an ultra-wide-band (UWB) communication module for performing a UWB communication method.

In an embodiment, the user terminal 110 may also be a device including or equipped with a BLE communication module or chip for performing BLE communication with the electronic device 100, and a UWB communication module or UWB tag for performing UWB communication.

A diagram on the left of FIG. 1 illustrates a case in which the electronic device 100 scans for a nearby device by using a BLE communication method.

BLE has a relatively low duty cycle of several milliseconds (ms) and consumes little power compared to other Bluetooth specifications. Therefore, in an embodiment, the electronic device 100 may continuously scan for nearby devices by using the BLE communication module even when the power of a screen is turned off.

In an embodiment, the BLE communication module included in the electronic device 100 may include a received signal strength indicator (RSSI). The RSSI may obtain an RSSI value for each of the nearby devices. RSSI values are measured in decibels per milliwatt (dBm) on a logarithmic scale and are indicated by a negative value. The more negative the RSSI value of a nearby device is, the farther away the nearby device is. For example, if a measured RSSI value has a value between −30 dBm and −20 dBm, it may indicate that a nearby device is close to the electronic device 100, and if the RSSI value has a value of −120 dBm, it may indicate that the nearby device is close to the detection limit.

A received signal strength in BLE is generally inversely proportional to a distance. For example, as shown in the diagram on the left of FIG. 1, the BLE communication module included in the electronic device 100 may be able to scan for nearby devices as long as they are located within a circle 120 having a radius of d1.

The electronic device 100 may scan for nearby devices by using the BLE communication module, but due to the nature of the BLE communication method, the electronic device 100 may not selectively scan only for a nearby device located in the same space as the electronic device 100. For example, this is because, even when a nearby device is located in a neighboring house, not in the same house, the nearby device may be found if it is located within the circle 120 having the radius of d1 from the electronic device 100.

In addition, as in the diagram on the left of FIG. 1, even when the electronic device 100 is located in a living room and the user terminal 110 is located in a room, as long as the user terminal 110 is located within the circle 120 having the radius of d1, the electronic device 100 may detect the user terminal 110.

In an embodiment, when an event occurs in the user terminal 110, the electronic device 100 may perform an operation corresponding to the event. However, as described above, even in a case where a nearby device found using the BLE communication module is not located in the same space as the electronic device 100, when the electronic device 100 operates in response to an event occurring in the nearby device, the operation is highly likely to be a malfunction that does not suit a user's intention.

In an embodiment, when a nearby device is found, the electronic device 100 may activate a UWB communication module to perform communication with the nearby device by using the UWB communication method. UWB is a wireless communication technology for transmitting a large amount of information over a very wide spectrum of bands compared to the existing spectrum. The electronic device 100 may use the UWB communication module to measure a location of the nearby device or more accurately measure motion or a direction of the nearby device.

A diagram on the right of FIG. 1 illustrates a case in which the electronic device 100 communicates with the user terminal 110 by using the UWB communication method. In the diagram on the right of FIG. 1, reference numeral 130 denotes an area in which UWB communication is possible.

Because UWB has higher linearity than BLE, the UWB may allow seamless signal transmission and reception with a nearby device in a line-of-sight (LOS) environment containing no obstacles. On the other hand, in a non-line-of-sight (NLOS) environment, radio waves are reflected and attenuated due to obstacles such as walls and doors, and thus, the strength of a UWB signal is greatly reduced. As can be seen in the diagram on the right of FIG. 1, when the electronic device 100 communicates with nearby devices using UWB, the electronic device 100 may smoothly communicate with a nearby device located in the same space, for example, in a living room, while it does not communicate with a nearby device located in a room or in a neighboring house blocked by walls.

In addition, in an embodiment, the electronic device 100 uses UWB to accurately detect various pieces of situation information, such as a location, a motion, a direction, and a distance to the electronic device, etc. of a UWB module, a UWB anchor, a UWB tag, or the like, mounted on a nearby device.

According to an embodiment, the electronic device 100 may perform communication by more accurately selecting only nearby devices located in the same space using characteristics of UWB. Furthermore, according to an embodiment, the electronic device 100 may provide user convenience by operating in accordance with the user's intention when an event occurs in nearby devices located in the same space.

Figure 2:
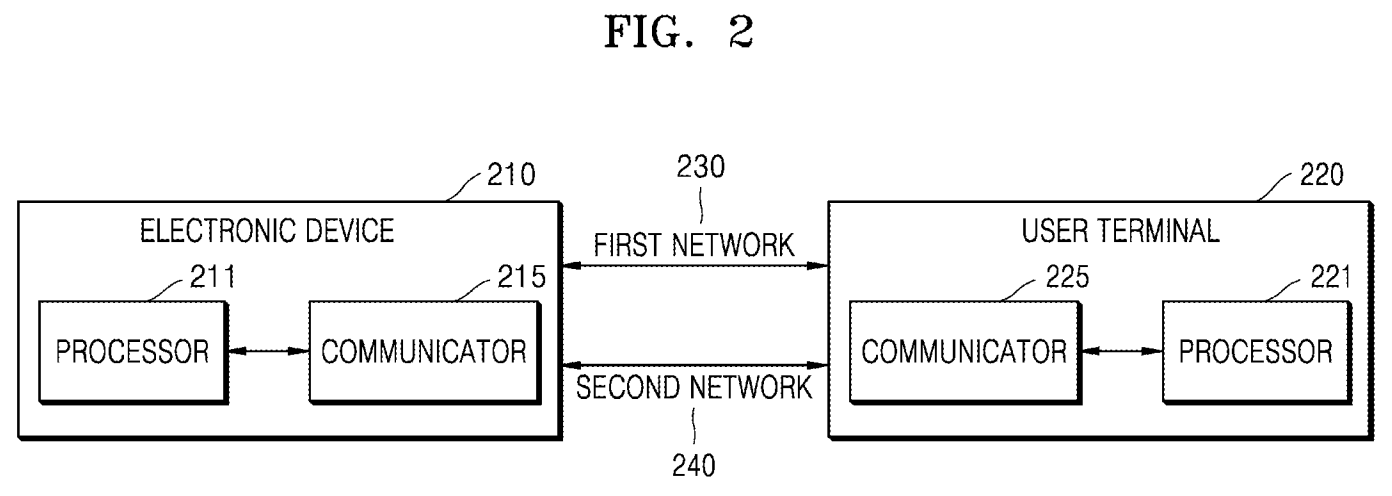

FIG. 2 is a diagram illustrating a case in which an electronic device and a user terminal are connected via a plurality of wireless networks, according to an embodiment.

Referring to FIG. 2, an electronic device 210 may be connected, directly or indirectly, to a user terminal 220 by using a first network 230 and a second network 240. In an embodiment, the first network 230 may include a BLE network. In an embodiment, the second network 240 may include a UWB network.

Hereinafter, the user terminal 220 connected to the electronic device 210 through a network is described first.

The user terminal 220 may be implemented as various types of devices capable of communicating with a nearby device.

The user terminal 220 may include at least one of a desktop, a smartphone, a tablet personal computer (PC), a mobile phone, a video phone, an e-book reader, a laptop PC, a netbook computer, a digital camera, a personal digital assistant (PDA), a portable multimedia player (PMP), a camcorder, a navigation device, a wearable device, a smart watch, a home network system, a security system, and a medical device.

The user terminal 220 may include a processor 221 and a communicator 225. The processor 221 controls all operations of the user terminal 220. The communicator 225 may include a BLE communication module for performing communication over the first network 230 and a UWB communication module for performing communication over the second network 240.

In an embodiment, the user terminal 220 may be an Internet of Things (IoT) type device equipped with a sensor to communicate with the electronic device 210. For example, the user terminal 220 may be various mobile objects, such as glasses, a bracelet, or the like capable of performing Internet communication, or various home appliances such as washing machines or refrigerators. In this case, the user terminal 220 may be equipped with a communication tag including the processor 221 and the communicator 225 to communicate with the electronic device 210.

Hereinafter, the electronic device 210 is described.

In an embodiment, the electronic device 210 may be an image display device. The image display device may be a digital TV capable of receiving digital broadcasting, but is not limited thereto, and may be implemented as various types of electronic devices capable of communicating with nearby devices.

For example, the image display apparatus may include at least one of a desktop, a smartphone, a tablet PC, a mobile phone, a video phone, an e-book reader, a laptop PC, a netbook computer, a digital camera, a PDA, a PMP, a camcorder, a navigation device, a wearable device, a smart watch, a home network system, a security system, and a medical device.

In an embodiment, the electronic device 210 may operate in a sleep mode or a normal mode depending on whether components included in the electronic device 210 operate.

The sleep mode may be a mode in which power of the electronic device 210 is saved. In the sleep mode, power may be supplied only to a communicator 215 of the electronic device 210, and power may be cut off to the other components. Accordingly, in the sleep mode, only a network function of the electronic device 210 may be performed.

The normal mode may refer to a state in which power is supplied to all the components of the electronic device 210. Because each component of the electronic device 210 normally operates in the normal mode, the user may normally use the electronic device 210 according to its functions, such as viewing content using the electronic device 210.

In an embodiment, the electronic device 210 may include a processor 211 and the communicator 215. The processor 211 controls all operations of the electronic device 210. The communicator 215 may connect the electronic device 210 with a nearby device or server.

In an embodiment, the communicator 215 may operate even in the sleep mode. That is, because the network function operates even when the electronic device 210 is in the sleep mode, the communicator 215 may scan for a nearby device using the first network 230. In an embodiment, the first network 230 may include the BLE network. In an embodiment, the communicator 215 may include a BLE communication module using the BLE network. A case in which a communication operation is performed using only the BLE network in the sleep mode is hereinafter referred to as a first sleep mode.

The electronic device 210 may transmit a BLE signal to scan for a nearby device. The electronic device 210 may transmit BLE signals to the surroundings at all times, periodically, at random time intervals, or at preset time points. A BLE signal may include a beacon signal.

Alternatively, in an embodiment, the user terminal 220 other than the electronic device 210 may transmit BLE signals to the surroundings. In this case, the electronic device 210 may scan for the BLE signals transmitted by the user terminal 220 at all times, periodically, at random time intervals, or at preset time points.

The electronic device 210 may search for the user terminal 220 by transmitting a BLE signal or by scanning for a BLE signal transmitted by the user terminal 220.

In an embodiment, when the user terminal 220 is found using a BLE signal, the communicator 215 may perform pairing with the user terminal 220 by using the second network 240. Pairing may refer to a process of enabling the electronic device 210 and the user terminal 220 to connect to each other for operation.

The second network 240 may include a UWB network. In an embodiment, the communicator 215 may include a UWB communication module using the UWB network.

The electronic device 210 may still operate in a sleep mode while performing pairing using the UWB network.

As described above, because UWB communication has strong linearity, in an embodiment, the electronic device 210 may perform pairing with the user terminal 220 located in the same space that the electronic device 210 is placed.

In an embodiment, when the user terminal 220 is not located in the same space as the electronic device 210, for example, when it is located in a space blocked by an obstacle such as a wall or a door, the electronic device 210 may not perform pairing with the user terminal 220.

In an embodiment, after performing pairing with the user terminal 220, the communicator 215 may perform UWB communication with the user terminal 220 by using the second network 240.

A sleep mode in which a communication operation is performed using the UWB network as well in the sleep mode is hereinafter referred to as a second sleep mode.

In an embodiment, the UWB communication module included in the communicator 215 may include a plurality of antennas. In an embodiment, the UWB communication module may include at least two receive (RX) antennas and at least one transmit (TX)/RX antenna. In an embodiment, antennas may be respectively arranged in vertical and horizontal directions on a front side of the electronic device 210. In an embodiment, the electronic device 210 may detect the location, motion, or direction of the user terminal 220 more accurately by using antennas respectively arranged in the horizontal and vertical directions.

In an embodiment, the electronic device 210 may identify the motion, location, or direction of the user terminal 220 by using the second network 240.

The electronic device 210 may detect whether a first event occurs in the user terminal 220 while communicating with the user terminal 220 using the second network 240.

In an embodiment, the first event may include a rapid change in a strength of a signal received from the user terminal 220. When the user terminal 220 is located in a place other than the same space as the electronic device 210 and moves to the same space, for example, when a holder of the user terminal 220, after leaving with the user terminal 220, comes back into the living room, which is the same space where the electronic device 210 is placed, or when the holder of the user terminal 220 leaves the room and brings the user terminal 220 and comes into the living room where the electronic device 210 is located, the user terminal 220 and the electronic device 210 may suddenly become close to each other. In this case, the electronic device 210 may detect that a magnitude of the signal received from the user terminal 220 rapidly changes to a certain level. The electronic device 210 may detect a change in the strength of the signal received from the user terminal 220 using the antennas included in the UWB communication module, and when magnitude of the signal is greater than or equal to a certain level or the strength of the signal is greater than or equal to a reference level, the electronic device 210 may detect that the first event has occurred in the user terminal 220.

In an embodiment, the first event may include a rapid change in a direction of the user terminal 220. When the holder of the user terminal 220 wants to control the electronic device 210 by using the user terminal 220, the user terminal 220 may be directed toward a direction in which the electronic device 210 is located. For example, when the holder of the user terminal 220 wants to use the user terminal 220 as a remote control for the electronic device 210, the holder may adjust the user terminal 220 to a certain velocity or higher so that a location or a direction of the user terminal 220 may be directed toward the electronic device 210. In this case, the electronic device 210 may detect that the direction of the user terminal 220 has rapidly changed toward the electronic device 210 by using UWB communication. The electronic device 210 detects a change in an angular velocity of the user terminal 220, and when the change in the angular velocity of the user terminal 220 is greater than or equal to a reference level, or when the changed direction of the user terminal 220 is included in a certain angle range with respect to a straight line connecting the electronic device 210 and the user terminal 220, the electronic device 210 may detect that the first event has occurred in the user terminal 220.

In an embodiment, the electronic device 210 may switch from a sleep mode to a normal mode when the first event has occurred in the user terminal 220. For mode switching, when the communicator 215 of the electronic device 210 detects occurrence of the first event in the user terminal 220, the communicator 215 may inform the processor 211 of the occurrence of the first event. For example, the communicator 215 may generate a wake-up signal for waking up the processor 211 and transmit the wake-up signal to the processor 211.

When receiving the wake-up signal from the communicator 215, the processor 211 may control the electronic device 210 to operate in the normal mode by supplying power to all of the components of the electronic device 210.

In an embodiment, the electronic device 210 may not detect the first event for a certain time period of time while operating in the sleep mode. In this case, the electronic device 210 may stop using the UWB network to prevent or reduce power consumption. Because the UWB network consumes more power than the BLE network, if the electronic device 210 does not detect the first event for a certain period of time after performing pairing using the UWB network, the electronic device 210 may deactivate the UWB network and perform again an operation of scanning for a nearby device by using only the BLE network. That is, when the electronic device 210 does not detect the first event while operating in the second sleep mode, the electronic device 210 may switch the mode to the first sleep mode.

In an embodiment, the electronic device 210 may detect whether a second event occurs in the user terminal 220 while operating in the normal mode. In an embodiment, the electronic device 210 may detect whether the second event occurs in the user terminal 220 by using a plurality of antennas included in the UWB communication module.

Like the first event, the second event may include at least one of a rapid change in a strength of a signal received from the user terminal 220 or a rapid change in the direction of the user terminal 220.

The second event is distinguished from the first event in that the second event occurs in the user terminal 220 while the electronic device 210 operates in the normal mode, while the first event occurs in the user terminal 220 while the electronic device 210 operates in the sleep mode.

For example, while viewing content using the electronic device 210, the user may direct the user terminal 220 toward the electronic device 210 so that the user terminal 220 and the electronic device 210 are suddenly brought closer to each other. The electronic device 210 may detect a change in a distance between the user terminal 220 and the electronic device 210 or a change in an angle therebetween by using UWB antennas, and when at least one of the change in the distance and the change in the angle is greater than or equal to a reference value, the electronic device 210 may detect that the second event has occurred. When the second event occurs in the user terminal 220, the electronic device 210 may output an interface screen for performing an interaction with the user terminal 220. For example, when the electronic device 210 detects that a second event occurs in the user terminal 220 while outputting content, the electronic device 210 may output an interface screen in the shape of a user terminal onto a screen of the content currently being output, thereby indicating that the electronic device 210 may be controlled by the user terminal 220.

In an embodiment, the user terminal 220 may also detect the occurrence of the second event. That is, when a strength of a signal received from the electronic device 210 rapidly increases as the user terminal 220 and the electronic device 210 are brought closer to each other, the user terminal 220 may detect that the second event has occurred. Also, when a direction that the user terminal 220 faces the electronic device 210 changes rapidly, the user terminal 220 may detect the occurrence of the second event. In an embodiment, the user terminal 220 may include at least one sensor, such as a geomagnetic sensor and/or a gyroscope sensor. The user terminal 220 may detect a direction of the user terminal 220 using such a sensor.

The user terminal 220 may output, in response to the occurrence of the second event, an interface screen for interaction with the electronic device 210 onto a screen of the user terminal 220. For example, the user terminal 220 may output, onto the screen of the user terminal 220, an interface screen having a form of a remote control for controlling the electronic device 210. The user may control the electronic device 210 by using the interface screen having the form of the remote control output onto the user terminal 220. In other words, the user may control the electronic device 210 by using the user terminal 220 similarly to a remote control. The user touches the interface screen having the form of the remote control output onto the user terminal 220 to control the electronic device 210 in various forms, such as pausing content being output from the electronic device 210, quickly viewing the content, or searching for other content.

As another example, when the electronic device 210 detects that the second event occurs in the user terminal 220 while currently outputting a payment screen for purchasing an item, the electronic device 210 may output an interface screen indicating that an interaction is being performed, e.g., an interface screen in the form of a user terminal. In addition, the user terminal 220 may output, in response to the occurrence of the second event, an interface screen for inputting authentication information related to payment onto the screen of the user terminal 220. For example, the user terminal 220 may output a keypad screen for entering information. The user may view the interface screen in the form of the user terminal, which is output onto a screen of the electronic device 210, recognize that information may be input to the electronic device 210 via the user terminal 220, and easily enter a payment password, an authentication number, or the like on the payment screen output onto the screen of the electronic device 210 by using a keypad output onto the screen of the user terminal 220. As another example, the user terminal 220 may output a screen for iris recognition, fingerprint recognition, or the like for user authentication. The user may perform identity authentication based on iris or fingerprints by using the user terminal 220. When the identity authentication is completed, the user terminal 220 may inform the electronic device 210 of the completion, so that the electronic device 210 may complete payment for an item currently being output.

In an embodiment, the electronic device 210 may identify whether a third event occurs in the user terminal 220 while operating in the normal mode. The third event may include a case where a strength of a signal received from the user terminal 220 rapidly changes to a level less than or equal to a specific reference level by using the plurality of antennas included in the UWB communication module. For example, while the electronic device 210 is outputting content in the normal mode, the user may go out carrying the user terminal 220. In this case, the electronic device 210 may no longer receive a network signal from the user terminal 220. When a strength of a signal received from the user terminal 220 rapidly changes to a level less than or equal to the reference level, the electronic device 210 may additionally check whether another event occurs during a certain period of time. The electronic device 210 may switch its mode from the normal mode to the sleep mode when the strength of the signal received from the user terminal 220 is less than or equal to the reference level and no other events occur for a certain period of time after the occurrence of the third event.

That is, when the electronic device 210 no longer receives a network signal from the user terminal 220, the electronic device 210 may switch to a mode in which power is supplied only to the communicator 215, thereby preventing or reducing unnecessary power consumption.

Furthermore, when an event is not detected from the user terminal 220 for a certain period of time even while the electronic device 210 operates in the second sleep mode, the electronic device 210 may switch from the second sleep mode to the first sleep mode.

In this way, according to an embodiment, the electronic device 210 may adaptively operate according to the user's intention by performing an appropriate operation based on whether an event has occurred in the user terminal 220 and what type of event has occurred.

Figure 3:
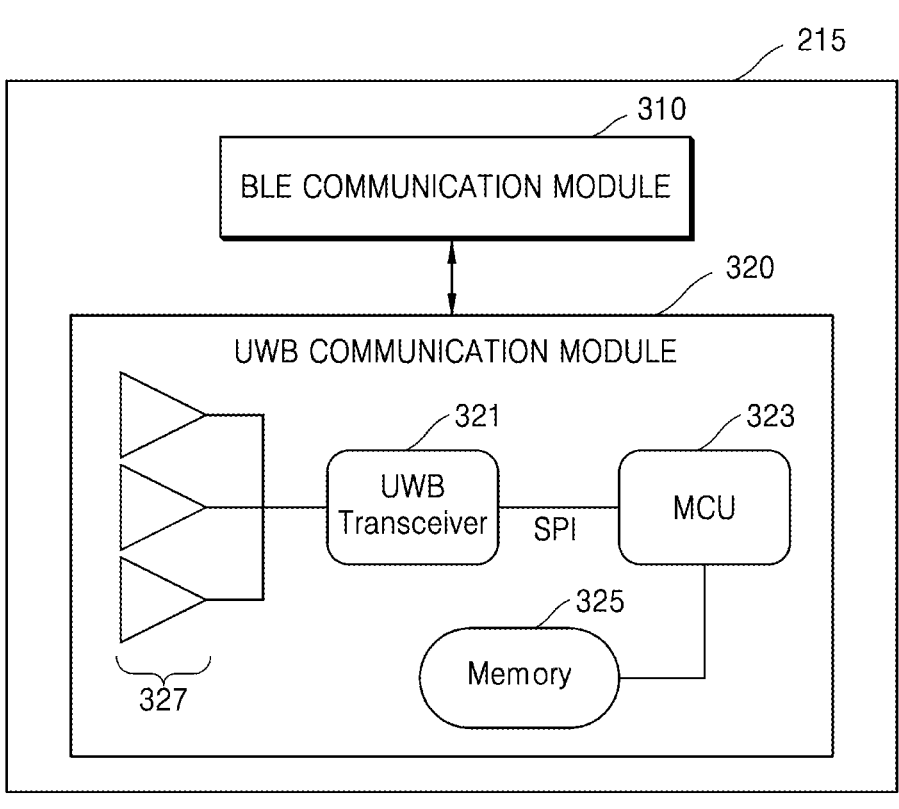
FIG. 3 is an internal block diagram of a communicator of FIG. 2, according to an example embodiment.

FIG. 3 is an internal block diagram of the communicator of FIG. 2, according to an embodiment.

Referring to FIG. 3, the communicator 215 included in the electronic device 210 may include a BLE communication module 310 and a UWB communication module 320.

The BLE communication module 310 may transmit or receive a BLE signal in accordance with the BLE communication standard. The BLE communication module 310 may scan for a BLE signal received from the user terminal 220 over the first network 230 or transmit a BLE signal to the user terminal 220.

When the user terminal 220 is found using a BLE signal, the BLE communication module 310 may inform the UWB communication module 320 that the user terminal 220 is found.

Even when the UWB communication module 320 is activated, the BLE communication module 310 may be continuously activated to transmit a BLE signal to surroundings or scan for a BLE signal received from a nearby device.

The UWB communication module 320 may transmit and/or receive a UWB signal to and/or from the user terminal 220 by using the second network 240. The UWB communication module 320 may also be referred to as a UWB anchor.

The UWB communication module 320 may include a UWB transceiver 321, a micro controller unit (MCU), a memory 325, and a plurality of antennas 327.

The UWB transceiver 321 is a terminal device or chipset that transmits and receives data using the UWB communication method, and may perform functions of both a transmitter for transmitting data and a receiver for receiving data. The UWB transceiver 321 may be connected, directly or indirectly, to the plurality of antennas 327 to simultaneously perform data transmission and reception. The UWB transceiver 321 may be connected, directly or indirectly, to the MCU 323 using a serial peripheral interface (SPI) or the like. The SPI may be one of the serial communication protocols such as I2C, CAN, and UART.

The MCU 323 is a dedicated processor of the UWB communication module 320 and may control all operations of the UWB communication module 320.

The MCU 323 may process UWB signals transmitted and received to and from the user terminal 220 via the plurality of antennas 327 and the UWB transceiver 321. The MCU 323 may detect at least one of a location, a distance, a motion, and a direction of the user terminal 220 by using the UWB signals.

In an embodiment, when a nearby device is found using a BLE signal, the BLE communication module 310 may inform the MCU 323 of the UWB communication module 320 that the nearby device is found.

In an embodiment, the MCU 323 may be activated only when receiving a signal indicating that the nearby device is found from the BLE communication module 310. The MCU 323 may execute at least one instruction or program stored in the memory 325 to control the UWB communication module 320 to operate.

The memory 325 may be, for example, a flash memory-type memory. The memory 325 may store at least one instruction or program executed by the MCU 323.

In an embodiment, the plurality of antennas 327 may include at least two RX antennas and at least one TX/RX antenna. TX and RX respectively indicate a transmission path and a reception path, and an RX antenna may perform a function of receiving a radio signal, and a TX/RX antenna may perform both transmission and reception functions as a single antenna. In an embodiment, the plurality of antennas 327 may be arranged in the vertical and horizontal directions on a front side of the electronic device 210 to more accurately detect a location, a motion, or a direction of the user terminal 220.

The UWB communication module 320 may perform pairing with the user terminal 220 through the second network 240. The UWB communication module 320 may perform pairing with the user terminal 220 by transmitting a signal for pairing to the user terminal 220 and receiving a response (acknowledgement (ACK)) signal from the user terminal 220 in reply thereto, or by receiving a signal for pairing from the user terminal 220 and transmitting an ACK signal in response thereto.

After performing pairing with the user terminal 220, the UWB communication module 320 may perform UWB communication with the user terminal 220 through the second network 240.

In an embodiment, the MCU 323 may detect that an event has occurred in the user terminal 220 while performing communication with the user terminal 220 using the UWB communication method. When the MCU 323 identifies that the first event has occurred in the user terminal 220 while the electronic device 210 is in the sleep mode, the MCU 323 may generate a wake-up signal for notifying this, and transmit the wake-up signal to the processor 211 of the electronic device 210. The processor 211 wakes up in response to receiving the wake-up signal from the MCU 323 and control the electronic device 210 so that other components of the electronic device 210 operate in the normal mode.

In an embodiment, when the first event does not occur in the user terminal 220 for a certain period of time after performing pairing with the user terminal 220, the UWB communication module 320 may no longer operate. In this case, only the BLE communication module 310 may be activated to transmit or receive a BLE signal.

In an embodiment, when the MCU 323 identifies that the second event has occurred in the user terminal 220 while the electronic device 210 is in the normal mode, the MCU 323 may notify the processor 211 of the occurrence of the second event. When being notified of the occurrence of the second event by the MCU 323, the processor 211 may control the electronic device 210 to output an interface screen.

In an embodiment, when the MCU 323 identifies that the third event has occurred in the user terminal 220 while the electronic device 210 is in the normal mode, the MCU 323 may notify the processor 211 of the occurrence of the third event. When being notified of the occurrence of the third event by the MCU 323, the processor 211 may control the electronic device 210 to switch to the sleep mode after a certain period of time elapses.

Figure 4:
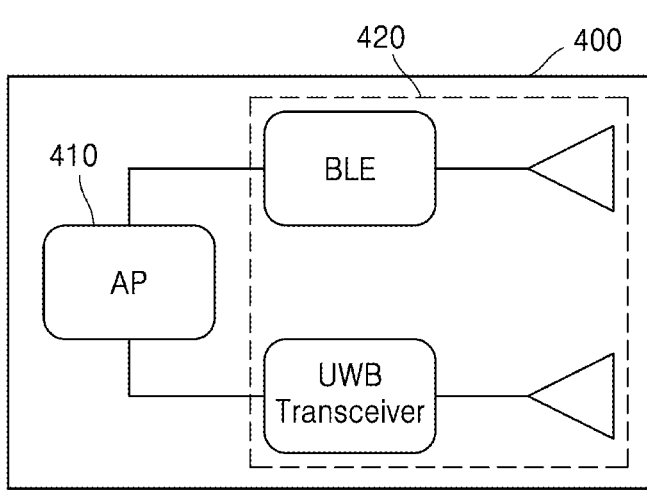
FIG. 4 is a diagram for describing a communication module or a communication tag included in a user terminal for communicating with an electronic device, according to an example embodiment.
Figure 4:
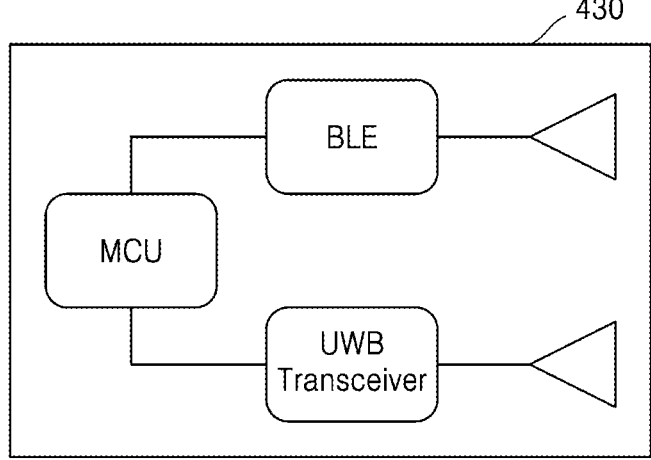

FIG. 4 is a diagram for describing a communication module or a communication tag included in a user terminal for communicating with an electronic device, according to an embodiment.

Referring to FIG. 4, the user terminal may be a mobile device 400 such as a smartphone, a tablet PC, or the like. The mobile device 400 may include an application processor (AP) and a communication module 420.

The AP 410 is a kind of CPU that drives an operating system (OS) and applications necessary for smart phones, tablet PCs, or the like, and may be a chip including functions for controlling various system devices/interfaces. The AP 410 may control the communication module 420 so that the mobile device 400 communicates with the electronic device 210.

In an embodiment, the communication module 420 may include a BLE communication module for performing BLE communication and a UWB communication module for performing UWB communication.

The BLE communication module may transmit BLE signals to the electronic device 210 over the first network 230 at all times, at regular intervals, or at preset time points, or scan for BLE signals transmitted from the electronic device 210. When the electronic device 210 is found using a BLE signal, the BLE communication module may notify the UWB communication module about this.

When receiving a signal indicating that the electronic device 210 is found from the BLE communication module, the UWB communication module may transmit a signal for UWB pairing to the electronic device 210 by using the second network 240. The UWB communication module may be paired with the electronic device 210 by receiving a response signal for pairing from the electronic device 210.

The UWB communication module may perform communication by transmitting and receiving UWB signals to and from the electronic device 210 paired therewith. The electronic device 210 may detect a location, a distance, a direction, etc. of the mobile device 400 using a UWB communication signal.

In an embodiment, the user terminal may be an object not provided with a communication function, such as a bag, a key, etc. In this case, the user may use an IoT technology by attaching a communication tag 430 to the user terminal. The IoT technology may refer to a technology that allows wireless communication to be performed between various objects embedded with sensors and communication functions. The user may attach the communication tag 430 to various objects, such as various home appliances, mobile equipment, wearable devices, etc., thereby enabling wireless communication between the user terminal and the electronic device 210.

In an embodiment, the communication tag 430 may include a BLE communication module, a UWB communication module, and an MCU for controlling the BLE communication module and the UWB communication module. Because functions performed by the communication tag 430 are the same as those performed by the BLE communication module 310 and the UWB communication module 320 included in the communicator 215 of FIG. 3, and the communication module 420 included in the mobile device 400 of FIG. 4, descriptions thereof will be omitted here.

Figure 5:
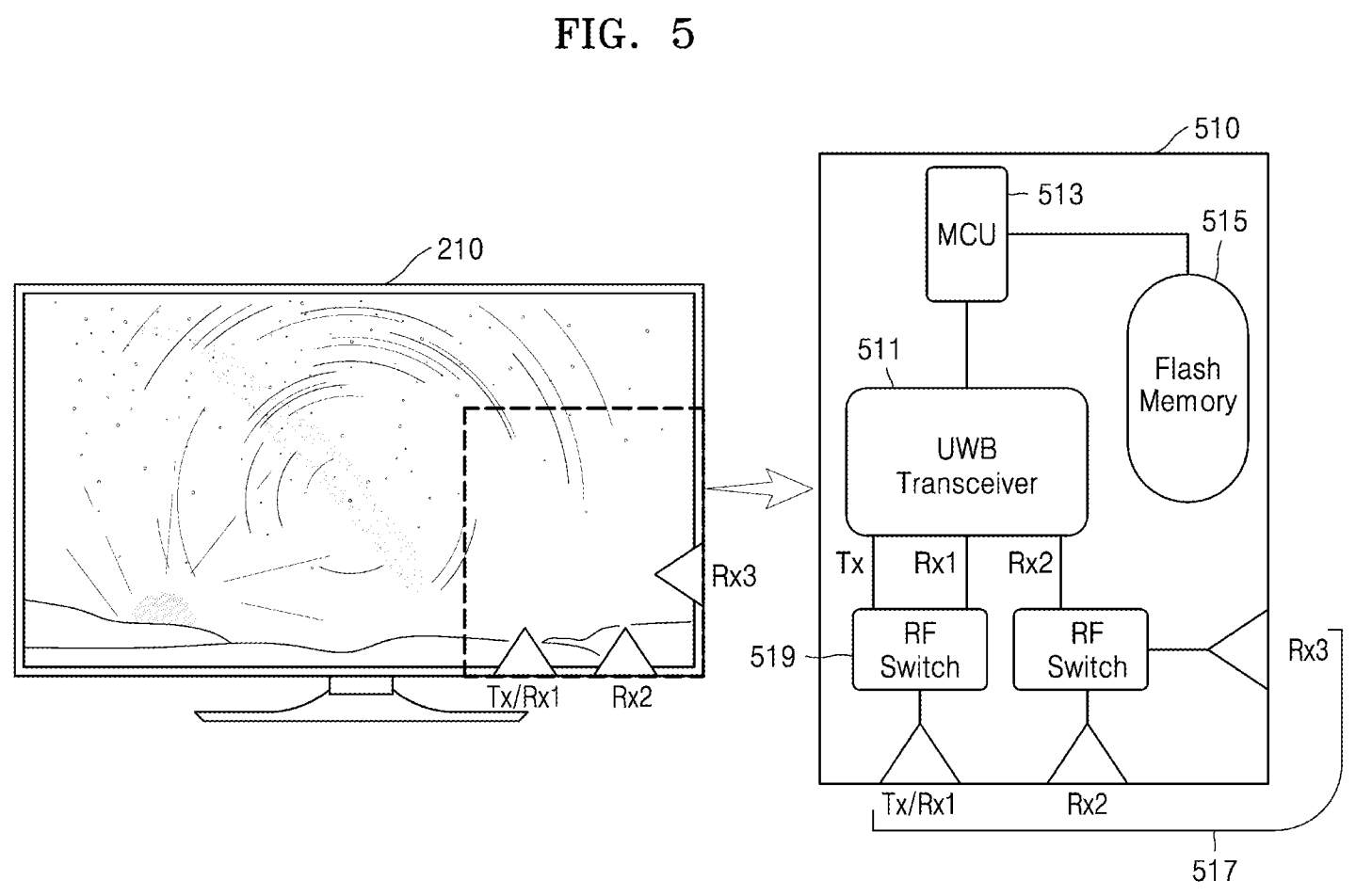

FIG. 5 is a diagram for describing an electronic device equipped with an UWB communication module, according to an embodiment.

Referring to FIG. 5, an electronic device 210 may be an image display device.

In an embodiment, the electronic device 210 may be equipped with a UWB communication module 510 comprising circuitry. The UWB communication module 510 may include a UWB transceiver 511, an MCU 513, a memory 515, a plurality of antennas 517, and radio frequency (RF) switches 519.

The UWB transceiver 511 may transmit and receive data using a UWB communication method.

The MCU 513 may control all operations of the UWB communication module 510. The MCU 513 may detect at least one of a location, a distance, a motion, and a direction of the user terminal 220 by using a UWB signal.

The memory 515 may store at least one instruction or program executed by the MCU 513.

The RF switches 519 may each determine whether to pass or block an RF signal.

The plurality of antennas 517 may be connected, directly or indirectly, to the UWB transceiver 511 via the RF switches 519.

In a case where the electronic device 210 is an image display device, because a bezel of the image display device tends to become thinner, the UWB communication module 510 needs to be mounted in the electronic device by taking into account a width of the bezel.

In an embodiment, while only the plurality of antennas 517 among the components included in the UWB communication module 510 may be located on a front side of the electronic device 210, the other components included in the UWB communication module 510 may be located on a back side of the electronic device 210. The plurality of antennas 517 are pattern antennas and may be mounted onto a flexible printed circuit board (FPCB). A PCB is a circuit component capable of transmitting electrical signals, and a FPCB is an electrical circuit board produced by adding flexible properties to a rigid PCB. In order to minimize or reduce a size of the UWB communication module 510, the plurality of antennas 517 may be mounted in a pattern on the FPCB folded to the front side of a display. Therefore, the plurality of antennas 517 are located near the bezel, and the rest of the UWB communication module 510 is connected, directly or indirectly, to a main body of the electronic device 210 at the back of the electronic device 210.

In an embodiment, the plurality of antennas 517 may be arranged in the vertical and horizontal directions of the electronic device 210. In an embodiment, the plurality of antennas 517 may include at least two RX antennas and at least one TX/RX antenna. Each RX antenna performs a function of receiving a radio signal, and the TX/RX antenna may perform both transmission and reception functions as a single antenna.

FIG. 5 shows an embodiment in which two antennas, e.g., a TX/RX1 antenna and an RX antenna, are mounted on the same FPCB and placed in the horizontal direction of the electronic device 210, and another antenna RX3 is mounted on a different FPCB and placed in the vertical direction. In an embodiment, by placing at least one antenna in the vertical and horizontal directions of the electronic device 210, the electronic device 210 may more accurately detect a location, a motion, or a direction of the user terminal 220.

Figure 6:
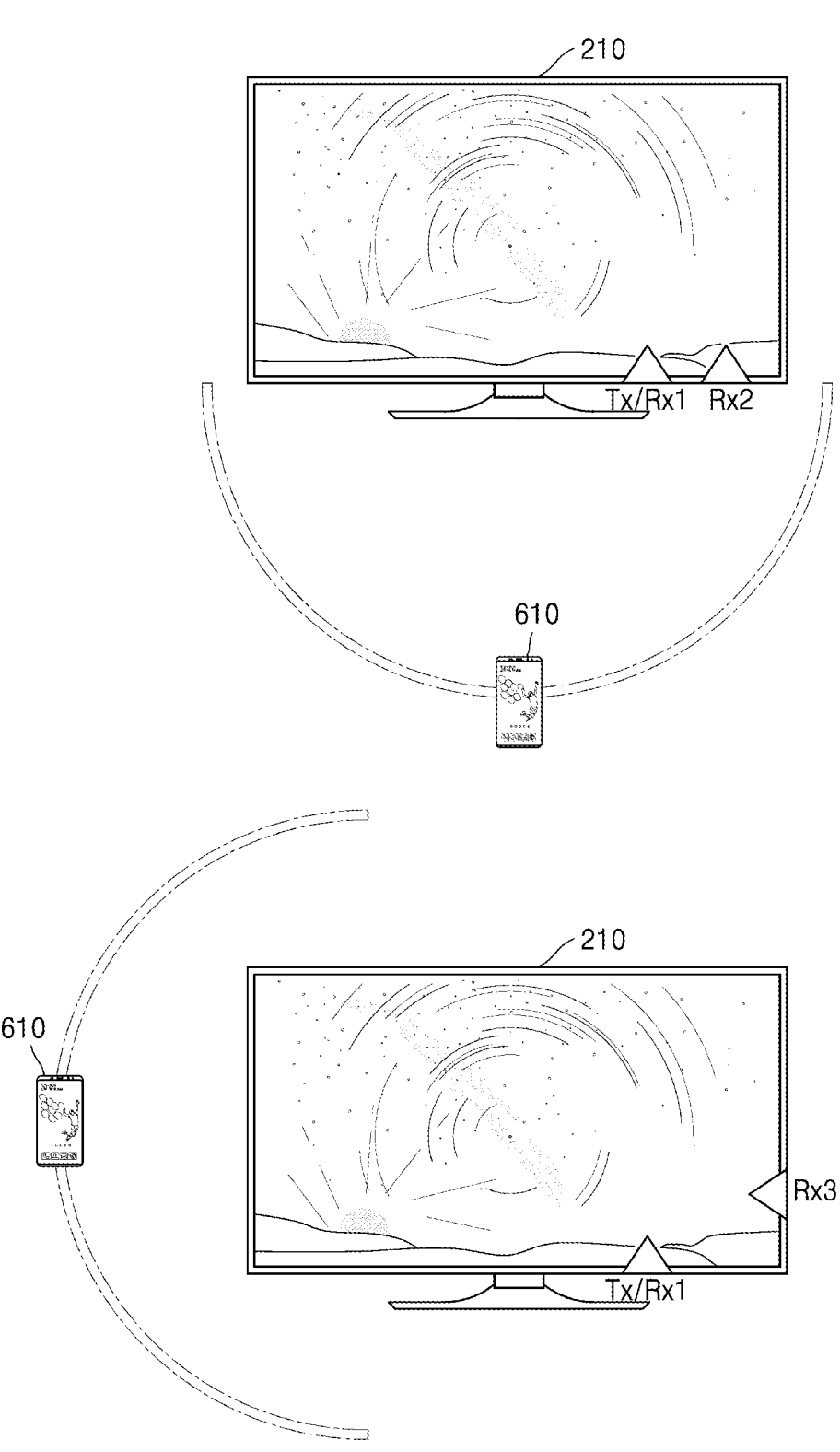
FIG. 6 is a diagram for describing an operation in which an electronic device detects a user terminal, according to an example embodiment.

FIG. 6 is a diagram for describing an operation in which an electronic device detects a user terminal, according to an embodiment.

A diagram at the top of FIG. 6 shows that motion of the user terminal 610 is detected using two antennas arranged in the horizontal direction on the front side of the electronic device 210.

The UWB communication module may determine a horizontal distance from the electronic device 210 to the user terminal 610. A process of determining the horizontal distance between the electronic device 210 and the user terminal 610 is called ranging. The electronic device 210 may measure a distance to the user terminal 610 using a travel time of a signal.

In an embodiment, two antennas, e.g., TX/RX1 antenna and RX2 antenna, arranged horizontally on a front side of the electronic device 210, may be used to detect the motion of the user terminal 610 in the horizontal direction. That is, the electronic device 210 may transmit a UWB signal to the user terminal 610 via the TX/RX1 antenna and receive UWB signals transmitted from the user terminal 610 via the TX/RX1 antenna and the RX2 antenna.

In an embodiment, because a plurality of antennas mounted in the horizontal direction on the electronic device 210 do not receive signals from the user terminal 610 at the same time, the electronic device 210 may determine a location of the user terminal 610 by taking into account a time difference of the signals received via the plurality of antennas and locations where the plurality of antennas are arranged. That is, by using at least two RX antennas arranged in the horizontal direction, the electronic device 210 may detect the motion of the user terminal 610 in the horizontal direction, a coordinate value of the user terminal 610 in the horizontal direction relative to the electronic device 210, etc.

A diagram at the bottom of FIG. 6 shows that motion of the user terminal 610 in the vertical direction is detected using antennas respectively arranged in the horizontal and vertical directions on the front side of the electronic device 210.

In an embodiment, the electronic device 210 may transmit a UWB signal to the user terminal 610 via a TX/RX1 antenna arranged in the horizontal direction, and receive a UWB signal transmitted from the user terminal 610 via the TX/RX1 antenna and an RX3 antenna arranged in the vertical direction. By using at least two RX antennas arranged up and down in the vertical direction, the electronic device 210 may detect the motion of the user terminal 610 in the vertical direction, a coordinate value of the user terminal 610 in the vertical direction relative to the electronic device 210, etc.

In an embodiment, the electronic device 210 may use a plurality of antennas arranged in the horizontal and vertical directions to detect vertical and horizontal movements of the user terminal 610, thereby detecting a three-dimensional (3D) movement of the user terminal 610. The electronic device 210 may use a plurality of antennas to detect at least one of a distance from the electronic device 210 to the user terminal 610, a direction of movement of the user terminal 610, a velocity of movement of the user terminal 610, and a change in angular velocity of the user terminal 610.

Figure 7:
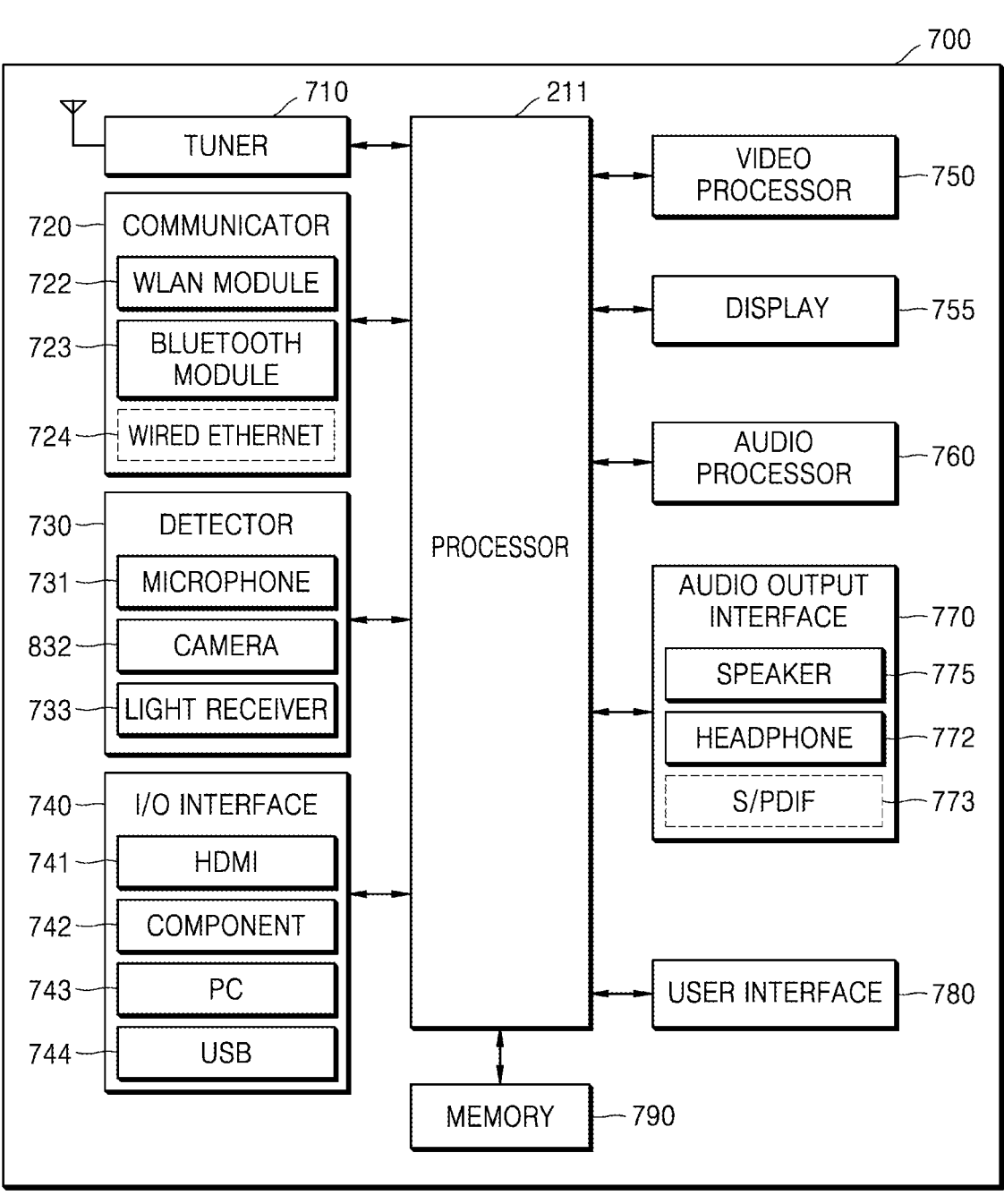
FIG. 7 is an internal block diagram of an electronic device according to an example embodiment.

FIG. 7 is an internal block diagram of an electronic device according to an embodiment.

An electronic device 700 of FIG. 7 may include components of the electronic device 210 of FIG. 2.

Referring to FIG. 7, the electronic device 700 may include the processor 211, a tuner 710, a communicator 720, a detector 730, an input/output (I/O) interface 740, a video processor 750, a display 755, an audio processor 760, an audio output interface 770, a user interface 780, and a memory 790.

By performing amplification, mixing, resonance, etc. of broadcast content or the like received in a wired or wireless manner, the tuner 710 may tune and then select only a frequency of a channel that the electronic device 700 desires to receive from among many radio wave components. The content received via the tuner 710 undergoes decoding to be separated into audio, video and/or additional information. The audio, video, and/or additional information may be stored in the memory 790 according to control by the processor 211.

The communicator 720 may connect the electronic device 700 to a nearby device, an external device, or a server according to control by the processor 211. Through the communicator 720, the electronic device 700 may download a program or an application needed by the electronic device 700 from an external device or server, or perform web browsing. Also, the communicator 720 may receive content from an external device.

The communicator 720 may include least one of a wireless local area network (WLAN) unit 721, a Bluetooth unit 722, a UWB unit 723, and a wired Ethernet unit 724 corresponding to the performance and structure of the electronic device 700.

The communicator 720 may also receive a control signal via a control device (not shown) such as a remote control according to control by the processor 211. The control signal may be implemented in the form of a Bluetooth signal, an RF signal, or a Wi-Fi signal. The communicator 720 may further include, in addition to the Bluetooth unit 722, other short-range communication units (e.g., a near field communication (NFC) unit (not shown)).

In an embodiment, the Bluetooth unit 722 may include a BLE communication module. According to an embodiment of the disclosure, the communicator 440 may exchange connection signals with the user terminal 220, etc. by using a BLE communication method. Functions performed by the BLE communication module included in the Bluetooth unit 722 are the same as those performed by the BLE communication module included in the communicator 215 of FIG. 2, and thus, detailed descriptions thereof will be omitted here.

In an embodiment, the UWB unit 723 may include a UWB communication module. By using very narrow pulses of several nanoseconds or picoseconds, the UWB communication module may perform precise distance and location measurement of a nearby device with a very low spectral power density over a very wide frequency band. The UWB communication module, comprising circuitry, may measure a location of the user terminal 220 or precisely measure movement or a direction of the user terminal 220.

Functions performed by the UWB communication module included in the UWB module 723 are the same as those performed by the UWB communication module included in the communicator 215 of FIG. 2, and thus, detailed descriptions thereof will be omitted here.

The detector 730 detects a user's voice, images, or interactions and may include a microphone 731, a camera 732, and a light receiver 733. The microphone 731 may receive a voice uttered by the user, convert the received voice into an electrical signal, and output the electrical signal to the processor 211. The camera 732 may include a sensor (not shown) and a lens (not shown) and capture an image formed on a screen. The light receiver 733 may receive an optical signal (including a control signal). The light receiver 733 may receive an optical signal corresponding to a user input (e.g., touching, pressing, touch gesture, voice, or motion) from a control device (not shown) such as a remote control, a mobile phone, or the like. A control signal may be extracted from the received optical signal according to control by the processor 211.

The I/O interface 740 may receive, according to control by the processor 211, from a device outside the electronic device 700, video (e.g., a moving image signal, a still image signal, etc.), audio (e.g., a voice signal, a music signal, etc.), and additional information such as metadata, etc. The metadata may include high dynamic range (HDR) information about content, a description of the content, a content title, a content storage location, etc. The I/O interface 740 may include one of a high-definition multimedia interface (HDMI) port 741, a component jack 742, a PC port 743, and a universal serial bus (USB) port 744. The I/O interface 740 may include a combination of the HDMI port 741, the component jack 742, the PC port 743, and the USB port 744.

The video processor 750 may process image data to be displayed by the display 755 and perform various image processing operations, such as decoding, rendering, scaling, noise filtering, frame rate conversion, resolution conversion, etc., on the image data.

The display 755 may display, on a screen, content received from a broadcasting station, an external server, an external storage medium, or the like. The content may include, as a media signal, a video signal, an audio signal, a text signal, etc. Also, the display 755 may display, on the screen, a video signal or an image received through the HDMI port 741.

When the display 755 is formed as a touch screen, the display 755 may be used as an input device as well as an output device. The display 755 may include at least one of a liquid crystal display (LCD), a thin-film-transistor LCD (TFT-LCD), an organic light-emitting diode (OLED), a flexible display, a 3D display, and an electrophoretic display. Furthermore, the display 755 may include two or more displays 755 according to its implemented configuration.

The audio processor 760 processes audio data. The audio processor 760 may perform various types of processing, such as decoding, amplification, noise filtering, etc., on the audio data.

The audio output interface 770 may output, according to control by the processor 211, audio contained in content received via the tuner 710, audio input via the communicator 720 or the I/O interface 740, and audio stored in the memory 790. The audio output interface 770 may include at least one of a speaker 771, a headphone output terminal 772, or a Sony/Phillips Digital Interface (S/PDIF) output terminal 773.

According to an embodiment of the disclosure, the user interface 780 may receive a user input for controlling the electronic device 700. The user interface 780 may include, but is not limited to, various types of input devices comprised of a touch panel for sensing a user's touch, a button for receiving a user's push manipulation, a wheel for receiving a user's rotation manipulation, a keyboard, a dome switch, a microphone for speech recognition, a motion detection sensor for sensing a motion, etc. In addition, when the electronic device 700 is manipulated by a remote control (not shown), the user interface 780 may receive a control signal received from the remote control.

The memory 790 may store at least one instruction. The memory 790 may store at least one program executed by the processor 211. Predefined operation rules or program may also be stored in the memory 790. In addition, the memory 790 may store data input to or output from the electronic device 700.

The memory 790 may include at least one type of storage medium from among a flash memory-type memory, a hard disk-type memory, a multimedia card micro-type memory, a card-type memory (e.g., an SD card or an XD memory), random access memory (RAM), static RAM (SRAM), read-only memory (ROM), electrically erasable programmable ROM (EEPROM), PROM, a magnetic memory, a magnetic disc, and an optical disc.

Figure 8:
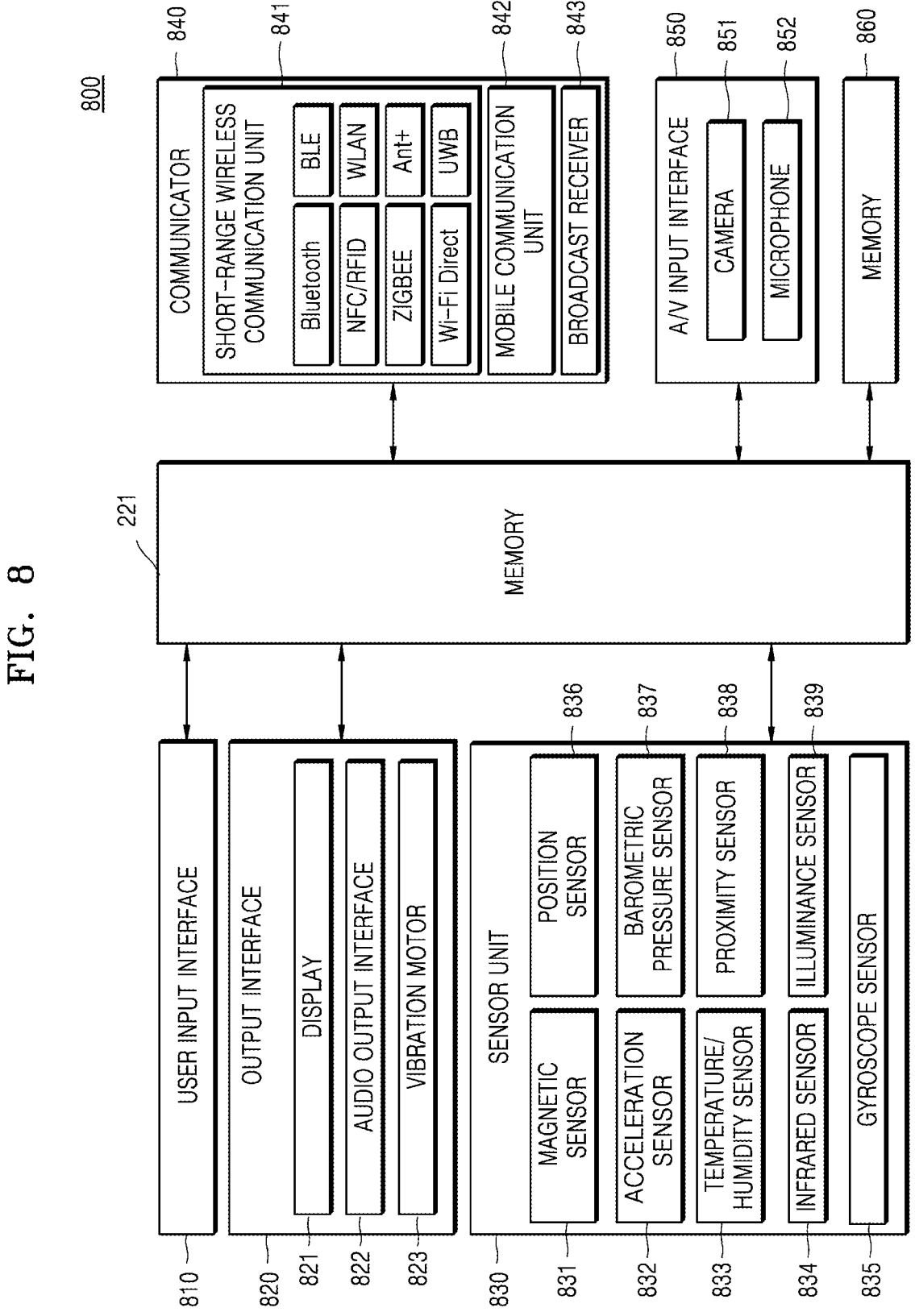
FIG. 8 is an internal block diagram of a user terminal according to an example embodiment.

FIG. 8 is an internal block diagram of a user terminal according to an embodiment.

A user terminal 800 of FIG. 8 may include components of the electronic device 210 of FIG. 2.

Referring to FIG. 8, the user terminal 800 may include a processor 221, a user input interface 810, an output interface 820, a sensor unit 830, a communicator 840, an audio/video (A/V) input interface 850, and a memory 860.

The user input interface 810 may refer to a means via which a user inputs data necessary for controlling the user terminal 800. The user terminal 810 may include, but is not limited to, a keypad, a dome switch, a touch pad (a capacitive overlay type, a resistive overlay type, an infrared beam type, a surface acoustic wave type, an integral strain gauge type, a piezoelectric type, etc.), a jog wheel, a jog switch, etc.

The output interface 820 may output an audio signal or a video signal and include a display 821, an audio output interface 822, and a vibration motor 823.

The vibration motor 823 may output a vibration signal. For example, the vibration motor 823 may output a vibration signal corresponding to an output of video data or audio data (e.g., a call signal reception sound, a message reception sound, etc.).

The sensor unit 830 may detect a status of the user terminal 800 or the surroundings of the user terminal 800, and transmit information about the detected status to the communicator 840 or the processor 221.

The sensor unit 830 may include, but is not limited to, at least one of a magnetic sensor 831, an acceleration sensor 832, a temperature/humidity sensor 833, an infrared sensor 834, a gyroscope sensor 835, a position sensor (e.g., a global positioning system (GPS)) 836, a barometric pressure sensor 837, a proximity sensor 838, and an illuminance sensor 839.

According to an embodiment, the sensor unit 830 may identify whether an event has occurred in the user terminal 800. An event detected by the user terminal 800 is hereinafter referred to as a fourth event.

In an embodiment, the fourth event may include at least one of a change in illuminance of the surroundings of the user terminal 800, a change in a distance between the user terminal 800 and the electronic device 210, a change in a direction of the user terminal 800, and a change in acceleration of the user terminal 800.

In an embodiment, the user terminal 800 may detect whether ambient illuminance of the user terminal 800 has changed using at least one sensor, for example, the illuminance sensor 839. The illuminance sensor 839 may measure the amount of ambient light and then measure brightness according to the amount of light. The illuminance sensor 839 may include a red/green/blue (RGB) sensor. An RGB sensor as a color sensor may convert light into electric charges by using a charge-coupled device (CCD) to detect the ambient color. The illuminance sensor 839 may include a photo resistor. The photo resistor may include a cadmium sulfide (CdS) sensor.

In an embodiment, the user terminal 800 may detect whether the user terminal 800 is outdoors or indoors according to ambient illuminance of the user terminal 800. Alternatively, the user terminal 800 may detect whether ambient illuminance has changed by more than a reference value. Alternatively, while the user terminal 800 already knows illuminance of a place where the electronic device 210 is located, the user terminal 800 may detect whether illuminance of the surroundings of the user terminal 800 and illuminance of the place where the electronic device 210 is located are within a predetermined range compared to each other.

When ambient illuminance of the user terminal 800 suddenly changes from a value indicating outdoors to a value indicating indoors, or when the user terminal 800 detects that illuminance of the surroundings of the user terminal 800 and illuminance of the place where the electronic device 210 is located are within a predetermined range compared to each other, the user terminal 800 may detect that the fourth event has occurred in the user terminal 800.

In an embodiment, the user terminal 800 may detect the direction of the user terminal 800 by using at least one sensor, for example, the magnetic sensor 831 and/or the gyroscope sensor 839. The magnetic sensor 831 may detect a direction of geomagnetism with respect to the user terminal 800. The gyroscope sensor 839 may detect an angular velocity which is a rotation speed of the user terminal 800. The gyroscope sensor 839 may also be referred to as an angular velocity sensor. The gyroscope sensor 839 may calculate the direction of the user terminal 800 by converting a Coriolis force generated when the user terminal 800 rotates into an electrical signal.

The user terminal 800 may identify a position of a device relative to the magnetic north pole by using at least one of the geomagnetic sensor 831 and the gyroscope sensor 839. In addition, the user terminal 800 may detect a relative direction to the electronic device 210 by using these sensors.

For example, when the user suddenly directs the user terminal 800 toward the electronic device 210, the user terminal 800 may detect that the direction of the user terminal 800 is suddenly changed toward the electronic device 210 within a reference time by using the magnetic sensor 831 and/or the gyroscope sensor 839. In this case, the user terminal 800 may detect that the fourth event has occurred.

In an embodiment, the user terminal 800 may detect a distance between the user terminal 800 and the electronic device 210 by using at least one sensor, for example, the position sensor 836 and/or the proximity sensor 838. In an embodiment, when the user terminal 800 is suddenly brought closer to the electronic device 210, for example, when the user moves the user terminal 800 to a position closer to the electronic device 210, the user terminal 800 may detect that the user terminal 800 and the electronic device 210 have become closer to each other by greater than or equal to a reference value within a reference time. In this case, the user terminal 800 may detect that the fourth event has occurred.

In an embodiment, the user terminal 800 may detect at which velocity the user terminal 800 moves closer to the electronic device 210 by using at least one sensor, for example, the position sensor 836 and/or the acceleration sensor 832. The user terminal 800 may detect that the fourth event has occurred when the velocity of movement of the user terminal 800 toward the electronic device 210 is greater than or equal to a reference velocity.

The communicator 840 may include components for performing communication with another device. For example, the communicator 840 may include a short-range wireless communication unit 841, a mobile communication unit 842, and a broadcast receiver 843.

The short-range wireless communication unit 841 may include, but is not limited to, a Bluetooth communication unit, a BLE communication unit, an NFC unit, a WLAN (or Wi-Fi) communication unit, a Zigbee communication unit, an Infrared Data Association (IrDA) communication unit, a Wi-Fi direct (WFD) communication unit, a UWB communication unit, and an Ant+ communication unit.

In an embodiment, the BLE communication unit may transmit BLE signals to the surroundings at all times, periodically, at random time intervals, or at preset time points.

Alternatively, in an embodiment, the BLE communication unit may receive BLE signals transmitted by the electronic device 210 to the surroundings. In other words, the BLE communication unit may scan for the BLE signals transmitted by the electronic device 210 at all times, periodically, at random time intervals, or at preset time points.

In an embodiment, when the electronic device 210 is detected via a BLE signal, the UWB communication unit may transmit, to the electronic device 210, a signal for performing pairing with the electronic device 210. Alternatively, in an embodiment, the UWB communication unit may perform pairing with the electronic device 210 by receiving a signal for performing pairing from the electronic device 210 and transmitting a response signal thereto.

In an embodiment, operation modes of the user terminal 800 may be classified into a sleep mode and a normal mode according to whether components included in the user terminal 800 are operated.

The sleep mode may be a mode in which power of the user terminal 800 is saved. In the sleep mode, power may be supplied only to the communicator 840 of the user terminal 800 and power may be cut off to the other components. Accordingly, in the sleep mode, only a network function of the user terminal 800 may be performed.

The normal mode may refer to a state in which power is supplied to all the components of the user terminal 800. Because each component of the user terminal 800 normally operates in the normal mode, the user may normally use the user terminal 800.

In an embodiment, when the sensor unit 830 detects that the fourth event has occurred in the user terminal 800 while the user terminal 800 is operating in the sleep mode, the sensor unit 830 may notify the communicator 840 about this. In an embodiment, when being notified of the occurrence of the fourth event in the user terminal 800 by the sensor unit 830, the communicator 840 may generate a wake-up signal and transmit the wake-up signal to the processor 221.

Alternatively, in another embodiment, when the sensor unit 830 detects that the fourth event has occurred in the user terminal 800 while the user terminal 800 is operating in the sleep mode, the sensor unit 830 may generate a wakeup signal and transmit it directly to the processor 221.

When the processor 221 recognizes that the fourth event has occurred in the user terminal 800, the processor 221 may control the user terminal 800 to normally operate by switching the sleep mode to the normal mode.

The mobile communicator 842 transmits or receives a wireless signal to or from at least one of a base station, an external terminal, and a server on a mobile communication network. In this case, the wireless signal may include a voice call signal, a video call signal, or various formats of data according to transmission and reception of text/multimedia messages.

The broadcast receiver 843 receives broadcast signals and/or broadcast-related information from the outside via a broadcast channel. The broadcast channel may include a satellite channel and a terrestrial channel. According to an implemented example, the user terminal 800 may not include the broadcast receiver 843.

The A/V input interface 850 is for inputting an audio signal or a video signal and may include a camera 851, a microphone 852, etc. The camera 851 may obtain an image frame such as a still or moving image via an image sensor in a video call mode or capture mode. An image captured via the image sensor may be processed by the processor 221 or a separate image processor (not shown).

An image frame processed by the camera 851 may be stored in the memory 860 or transmitted to the outside via the communicator 840. The camera 851 may include two or more cameras depending on a configuration of the user terminal.

The microphone 852 receives an external audio signal and process the audio signal as electrical audio data. For example, the microphone 2620 may receive an audio signal from an external device or a speaker. The microphone 852 may use various noise removal algorithms to remove noise that occurs in the process of receiving an external audio signal.

The memory 860 may store programs necessary for processing or control performed by the processor 221 or store data input to or output from the user terminal 800.

The memory 860 may include at least one type of storage medium from among a flash memory-type memory, a hard disk-type memory, a multimedia card micro-type memory, a card-type memory (e.g., an SD card or an XD memory), RAM, SRAM, ROM, EEPROM, PROM, a magnetic memory, a magnetic disc, and an optical disc.

Figure 9:
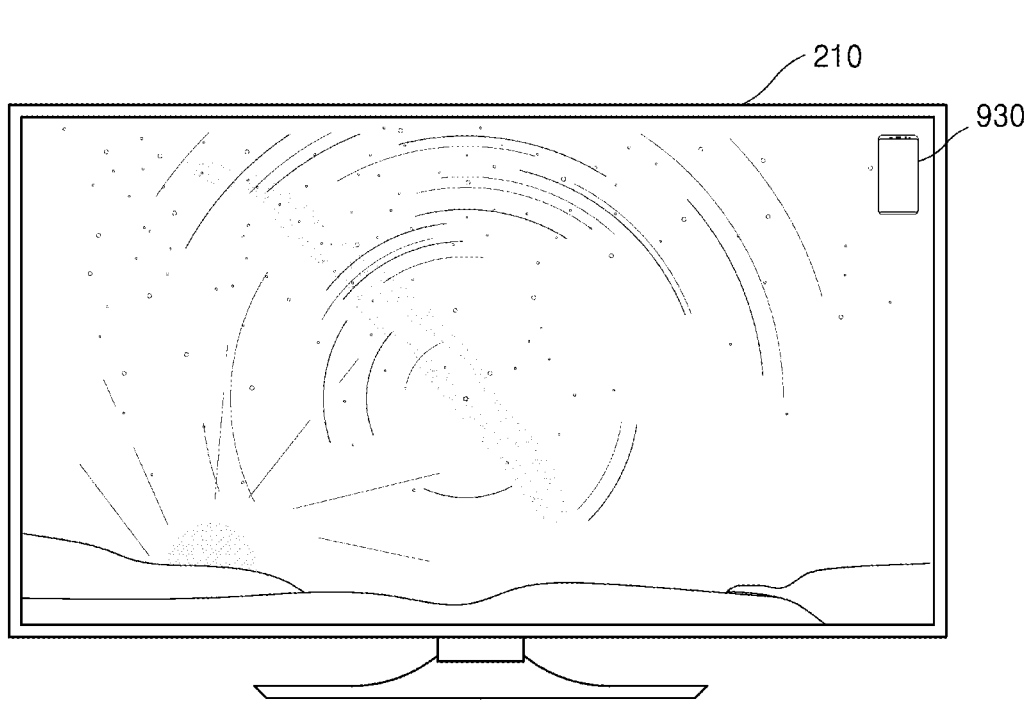
FIG. 9 is a diagram for describing occurrence of an event in a user terminal, according to an example embodiment.
Figure 9:
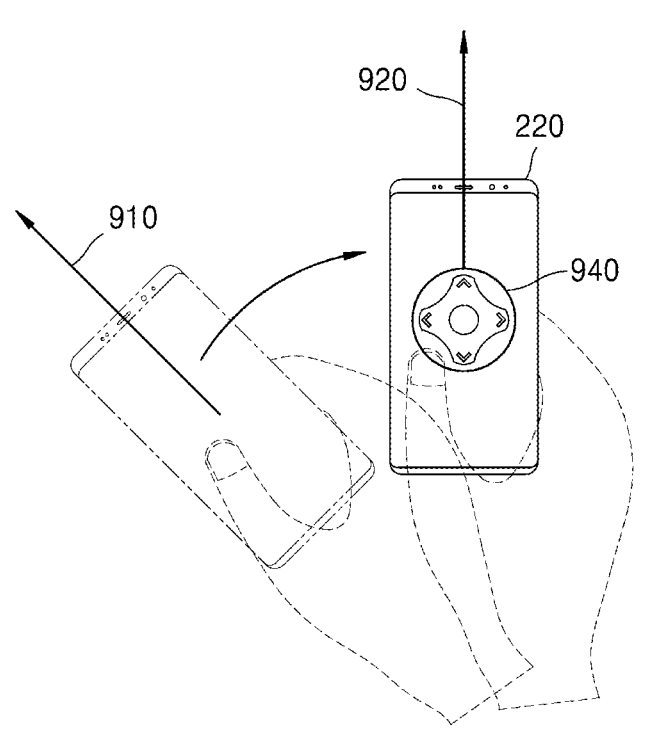

FIG. 9 is a diagram for describing occurrence of an event in a user terminal, according to an embodiment.

Referring to FIG. 9, a user may move the user terminal 220 to point away from a first direction 910 and towards a second direction 920. Here, pointing toward the second direction may be a case where a direction in which a sensor mounted on the user terminal 220 points is close to a direction facing the electronic device 210 within a predetermined range.

In an embodiment, a change in the direction of the user terminal 220 may be recognized as different events according to an operation mode of the electronic device 210 and an operation mode of the user terminal 220.

First, it is assumed that the electronic device 210 operates in the sleep mode.

In the sleep mode, power may be supplied only to the communicator 215 of the electronic device 210, and power may be cut off to the other components. In the sleep mode, when detecting the user terminal 220 by transmitting a BLE signal to the surroundings or scanning for a BLE signal transmitted by the user terminal 220, the communicator 215 may perform pairing to transmit and receive UWB signals to and from the user terminal 220. The communicator 215 may perform UWB communication by transmitting and receiving UWB signals to and from the user terminal 220.

In an embodiment, while the communicator 215 performs UWB communication with the user terminal 220 in the sleep mode, when a direction change occurs in the user terminal 220 as shown in FIG. 9, the communicator 215 may detect the direction change as a first event. When detecting that the first event has occurred in the user terminal 220, the communicator 215 may generate a wake-up signal and transmit the wake-up signal to the processor 211 of the electronic device 210.

The processor 211 of the electronic device 210 may receive the wake-up signal from the communicator 215, and accordingly, control the electronic device 210 to switch from the sleep mode to the normal mode and operate. In the normal mode, power is supplied to all components of the electronic device 210 so that the electronic device 210 may operate normally.

Next, it is assumed that the electronic device 210 operates in the normal mode.

While the electronic device 210 performs UWB communication with the user terminal 220 in the normal mode, when a direction change occurs in the user terminal 220 as shown in FIG. 9, the communicator 215 may detect that a second event has occurred in the user terminal 220. In this case, the communicator 215 may generate a signal for notifying that the second event has occurred in the user terminal 220 and transmit the signal to the processor 211.

When the processor 211 detects that the second event has occurred in the user terminal 220 via the communicator 215, the processor 211 may output, onto a display, an interface screen for performing an interaction with the user terminal 220.

For example, when the electronic device 210 is currently outputting content, as shown in FIG. 9, the electronic device 210 may output, in response to the occurrence of the second event in the user terminal, an interface screen 930 having a form of a user terminal onto a screen on which the content is currently being output. The user may view the interface screen 930 having the form of a user terminal, which is output onto the screen of the electronic device 210, and recognize that the user is able to control the electronic device 210 by using the user terminal 220.

Furthermore, together with or separately from this, the user terminal 220 may detect that the second event has occurred and output an interface screen for controlling the electronic device 210. For example, as shown in FIG. 9, the user terminal 220 may output an interface screen 940 having a form of a remote control in response to the occurrence of the second event. The user may control the electronic device 210 by using, similarly to a remote control, the interface screen 940 having the form of the remote control, which is output onto a screen of the user terminal 220.

As another example, when the electronic device 210 is currently outputting a screen for selecting content or a button, for example, when a user tries to search for specific content using the electronic device 210, the electronic device 210 may output, in response to the occurrence of the second event in the user terminal 220, an interface screen in a form that allows the user to directly input information via a keypad of the user terminal 220 or the like on the electronic device 210. In addition, the user terminal 220 may detect that the second event has occurred and output an interface screen having a form of a keypad or computer keyboard. The user may easily input desired information to the electronic device 210 by using the interface screen having the form of a computer keyboard output on the screen of the user terminal 220. That is, the user may easily search for desired content on the electronic device 210 by directly entering a search term on the interface screen output on the electronic device 210.

Finally, it is assumed that the user terminal 220 operates in the sleep mode regardless of the mode of the electronic device 210.

It is assumed that a direction change occurs in the user terminal 220 as shown in FIG. 9 while the user terminal 220 operates in the sleep mode in which only the communicator 225 is activated. In this case, the user terminal 220 may detect the direction change occurring in the user terminal 220 as a fourth event. The fourth event is an event that the user terminal 220 itself detects regardless of the electronic device 210, and the user terminal 220 may detect the fourth event by using at least one sensor provided in the user terminal 220. For example, the user terminal 220 may detect a direction change in the user terminal 220 by using at least one of a magnetic sensor and a gyroscope sensor. When detecting that the direction of the user terminal 220 is suddenly changed towards the electronic device 210 within a reference time, the user terminal 220 may detect that the fourth event has occurred. In an embodiment, the user terminal 220 may switch a current operation mode from the sleep mode to the normal mode in response to detecting the fourth event.

According to the embodiment, when the direction of the user terminal 220 suddenly faces the electronic device 210 as described above, the electronic device 210 may recognize the change in the direction of the user terminal 220 as the first or second event according to whether the electronic device 210 is in the sleep mode or in the normal mode, and perform an operation corresponding to a type of the recognized event.

Also, according to an embodiment, when the user terminal 220 suddenly faces the electronic device 210 while operating in the sleep mode, the user terminal 220 may recognize this as the fourth event and perform a corresponding operation accordingly.

Figure 10:
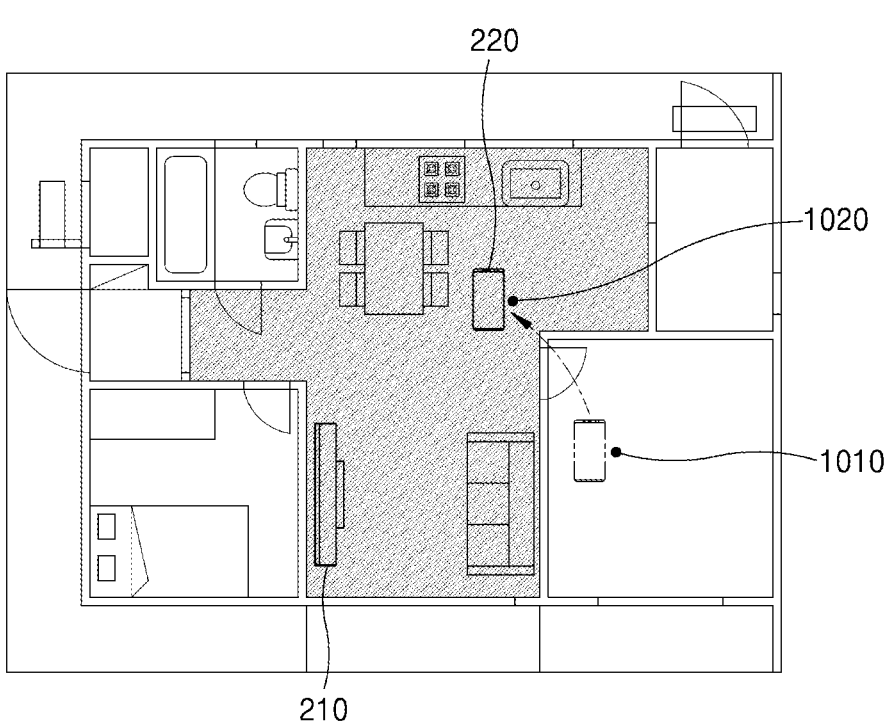
FIG. 10 is a diagram for describing occurrence of an event in a user terminal, according to an example embodiment.

FIG. 10 is a diagram for describing occurrence of an event in a user terminal, according to an embodiment.

Referring to FIG. 10, the user may move the user terminal 220 from a first position 1010 to a second position 1020. Here, the first position 1010 may represent a position of the user terminal 220 in an environment in which the user terminal 220 and the electronic device 210 are separated by an obstacle such as a wall, e.g., in a NLOS environment, and the second position 1020 may represent a position of the user terminal 220 under a LOS environment where there is no obstacle between the user terminal 220 and the electronic device 210.

Because a UWB signal has a high linearity, the strength of the UWB signal is rapidly weakened when encountering an obstacle. Therefore, when the user terminal 220 is at the first position 1010, the electronic device 210 does not recognize a UWB signal received from the user terminal 220 well. On the other hand, when the user terminal 220 is moved to the second position 1020, the electronic device 210 receives a rapidly strengthened UWB signal from the user terminal 220.

In an embodiment, a change in signal strength according to a change in position of the user terminal 220 may be recognized as different events depending on an operation mode of the electronic device 210 and an operation mode of the user terminal 220.

First, it is assumed that the electronic device 210 operates in the sleep mode.

In the sleep mode, when detecting the user terminal 220 via a BLE signal in the sleep mode, a BLE signal transmitted by the user terminal 220, the communicator 215 may perform pairing with the user terminal 220 and then UWB communication therewith.

In an embodiment, while the communicator 215 performs the UWB communication with the user terminal 220 in the sleep mode, when a change occurs in a strength of a signal received from the user terminal 220 as shown in FIG. 10, the communicator 215 may detect the change as a first event. When detecting that the first event has occurred in the user terminal 220, the communicator 215 may generate a wake-up signal and transmit the wake-up signal to the processor 211 of the electronic device 210, so that the electronic device 210 may switch from the sleep mode to the normal mode to operate.

Next, it is assumed that the electronic device 210 operates in the normal mode.

While the electronic device 210 performs UWB communication with the user terminal 220 in the normal mode, when a change occurs in a strength of a signal received from the user terminal 220 as shown in FIG. 10, the communicator 215 may detect that a second event has occurred in the user terminal 220. In this case, the processor 211 may detect that the second event has occurred in the user terminal 220 via the communicator 215, and output, onto a display, an interface screen for performing an interaction with the user terminal 220. For example, the interface screen may have a form of a remote control or a user terminal.

Also, in an embodiment, when detecting that the second event has occurred, the user terminal 220 may output an interface screen for interaction with the electronic device 210 onto the screen of the user terminal 220 as well. The user terminal 220 may output an interface in the form of a remote control or an interface in the form of a keypad or computer keyboard so that the user can control the electronic device 210 by using the user terminal 220.

Finally, it is assumed that the user terminal 220 operates in the sleep mode regardless of the mode of the electronic device 210.

When the user terminal 220 is suddenly brought closer to the electronic device 210 as shown in FIG. 10 while operating in the sleep mode in which only the communicator 225 is activated, e.g., when a distance between the user terminal 220 and the electronic device 210 suddenly decreases, the user terminal 220 may detect the sudden change in distance between the user terminal 220 and the electronic device 210 as being a fourth event. The user terminal 800 may detect the fourth event by using at least one sensor provided in the user terminal 220. For example, the user terminal 220 may detect the distance between the user terminal 220 and the electronic device 210 by using a position sensor and/or a proximity sensor. In an embodiment, the user terminal 220 may detect at which velocity the user terminal 220 moves closer to the electronic device 210 by using a position sensor and/or an acceleration sensor. The user terminal 220 may detect that the fourth event has occurred when the user terminal 220 rapidly moves closer to the electronic device 210 at a velocity greater than or equal to a reference velocity.

The user terminal 220 may switch a current operation mode from the sleep mode to the normal mode in response to detecting the fourth event.

As described above, according to an embodiment, when a signal strength between the user terminal 220 and the electronic device 210 suddenly increases, the electronic device 210 may recognize an event occurring in the user terminal 220 as the first or second event according to whether the electronic device 210 is in the sleep mode or the normal mode and perform an operation corresponding to the type of the recognized event.

In addition, according to an embodiment, when the distance between the user terminal 220 and the electronic device 210 suddenly decreases while the user terminal 220 operates in the sleep mode, the user terminal 220 may recognize this as the fourth event and perform a corresponding operation accordingly.

Figure 11:
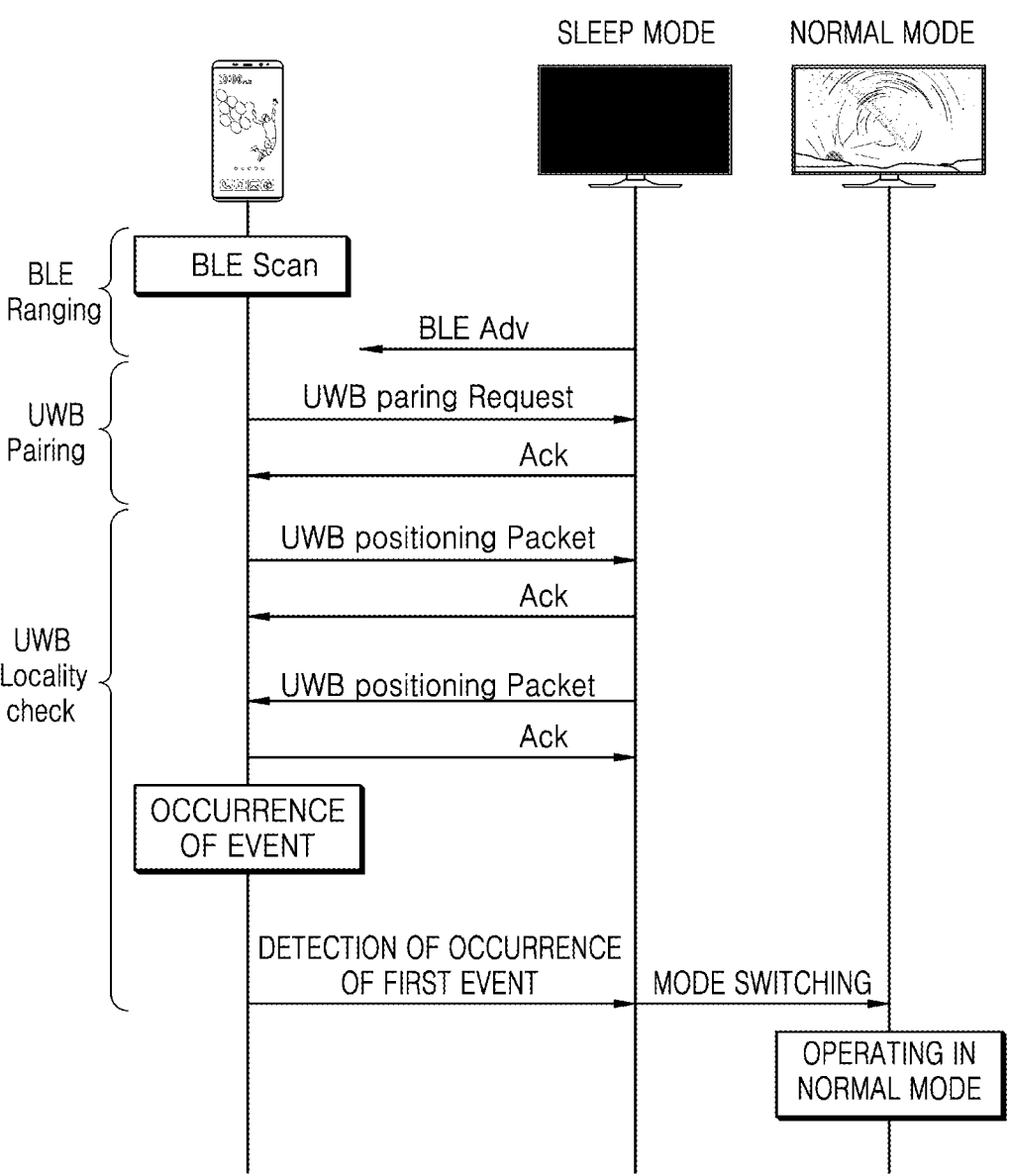
FIG. 11 is a diagram for describing a case where an electronic device detects a first event occurring in a user terminal, according to an example embodiment.

FIG. 11 is a diagram for describing a case where an electronic device detects a first event occurring in a user terminal, according to an embodiment.

Referring to FIG. 11, the electronic device may operate in the sleep mode. The electronic device may transmit a BLE signal to the surroundings in the sleep mode. The BLE signal may include a BLE Adv. (BLE advertising packet). The BLE advertising packet may include header data and user-specified data. Header data may include a 6-byte media access control (MAC) address. The MAC address may be a unique address value for identifying a Bluetooth device.

In an embodiment, the user-specified data may include a UWB session identifier (ID). The UWB session ID may be information for notifying the surroundings that the electronic device is able to perform UWB communication.

The electronic device may transmit BLE advertising packets at all times or periodically. The electronic device may adjust an interval for transmitting BLE advertising packets. The shorter an interval for transmitting BLE advertising packets, the faster a nearby device is recognized, but the higher the current consumption.

The user terminal may scan for the BLE advertising packets transmitted by the electronic device.

Although it has been described with reference to FIG. 11 that the electronic device transmits BLE advertising packets to the surroundings and the user terminal scans for them, this is an embodiment, and the user terminal may transmit BLE advertising packets to the surroundings and the electronic device may scan for them.

A process from when the electronic device or user terminal transmits a BLE advertising packet to the surroundings to when a counterpart device scans for the BLE advertising packet may be referred to as a BLE ranging process.

After receiving a BLE advertising packet, the user terminal may identify that the electronic device can perform UWB communication by using a UWB session ID included in the BLE advertising packet. The user terminal may transmit a signal for UWB pairing to the electronic device.

UWB pairing may refer to a process in which the user terminal and the electronic device search for, select, and register a device to perform UWB communication. A signal for UWB pairing may include a UWB pairing request signal. The UWB pairing request signal may be a signal for requesting an electronic device having a UWB session ID to perform UWB pairing.

The electronic device may receive the UWB pairing request signal from the user terminal and transmit an ACK signal to the user terminal in response to the UWB pairing request signal. Through this, the electronic device and the user terminal may perform pairing with each other.

Although it has been described with reference to FIG. 11 that the user terminal transmits a UWB pairing request signal and the electronic device transmits an ACK signal to the user terminal in response to the UWB pairing request signal, this is an embodiment, and the electronic device may transmit a UWB pairing request signal to the user terminal and the user terminal may transmit an ACK signal to the electronic device in response thereto to thereby perform pairing.

After performing the UWB pairing, the electronic device and the user terminal may each perform a UWB locality check. The UWB locality check may refer to a process of detecting a location, direction, movement, etc. of a counterpart device by using a UWB signal while performing UWB communication. The electronic device and the user terminal may each detect at least one of a position or coordinates, movement, and direction of a counterpart device by transmitting a UWB positioning packet to the counterpart device and receiving an ACK signal in response thereto from the counterpart device.

In an embodiment, while operating in the sleep mode, the electronic device may detect that the first event has occurred in the user terminal when performing UWB communication with the user terminal.

The first event may include a case in which a direction of the user terminal suddenly changes toward the electronic device, or a strength of a UWB signal received from the user terminal rapidly changes to greater than or equal to a reference level.

When detecting that the first event has occurred in the user terminal, the electronic device may switch its mode from the sleep mode to the normal mode.

Therefore, according to an embodiment, when the user terminal suddenly moves to the same space as the electronic device or the user terminal suddenly faces the electronic device, the electronic device may detect that the first event has occurred in the user terminal, and may automatically switch to the normal mode and turn on without the user needing to separately turn on power of the electronic device, thereby providing user convenience.

Figure 12:
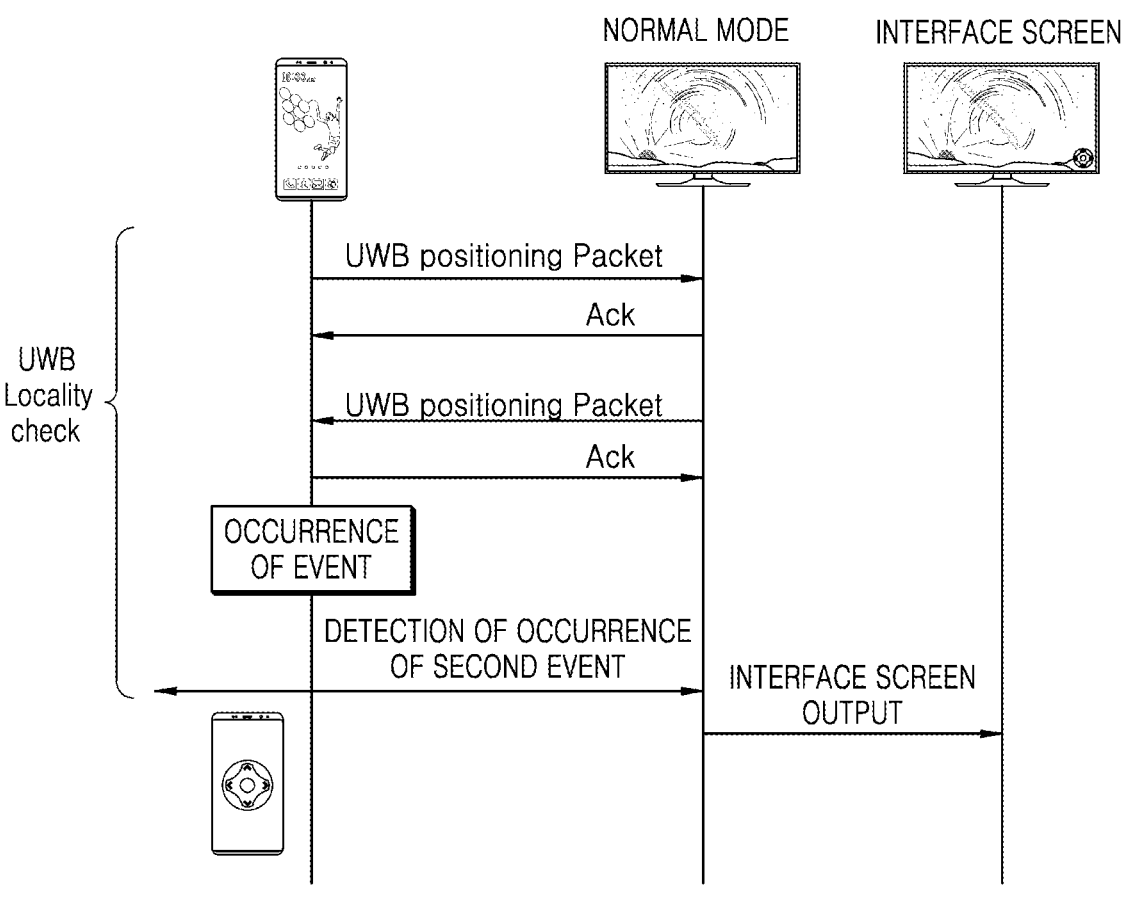
FIG. 12 is a diagram for describing a case where an electronic device detects a second event occurring in a user terminal, according to an example embodiment.

FIG. 12 is a diagram for describing a case where an electronic device detects a second event occurring in a user terminal, according to an embodiment.

Referring to FIG. 12, the electronic device may operate in the normal mode. The electronic device may perform UWB communication with the user terminal in the normal mode. The electronic device and the user terminal may each perform a UWB locality check to detect a position, direction, movement, etc. of the other party while performing the UWB communication.

In an embodiment, the electronic device may detect that the second event has occurred in the user terminal while communicating with the user terminal using a UWB signal.

Like the first event, the second event may include a case where a direction of the user terminal suddenly changes toward the electronic device or a strength of a UWB signal received from the user terminal suddenly changes to greater than or equal to a reference level.

When detecting that the second event has occurred in the user terminal, the electronic device may overlay and output an interface screen onto a screen being output. The interface screen may be a screen for the electronic device to interact with the user terminal. For example, the interface screen may be in the form of a user terminal or a remote control. The user may view the interface screen output on the electronic device and detect that the user is able to control the electronic device by using the user terminal.

Also, when detecting that the second event has occurred, the user terminal may output an interface screen for interaction with the electronic device onto a screen of the user terminal as well. The user terminal may be in the form of a remote control including selection buttons or direction keys or a keypad or computer keyboard including input buttons. The user may control the electronic device or input information to the electronic device by using the interface screen output on the user terminal.

As described above, according to an embodiment, while operating in the normal mode, when the user terminal moves closer to the electronic device or the direction of the user terminal changes to point toward the electronic device, the electronic device may detect that the second event has occurred, and automatically output an interface screen for performing an interaction with the user terminal without the user needing to perform a separate operation, thereby performing an operation that more closely matches the user's intention.

Figure 13:
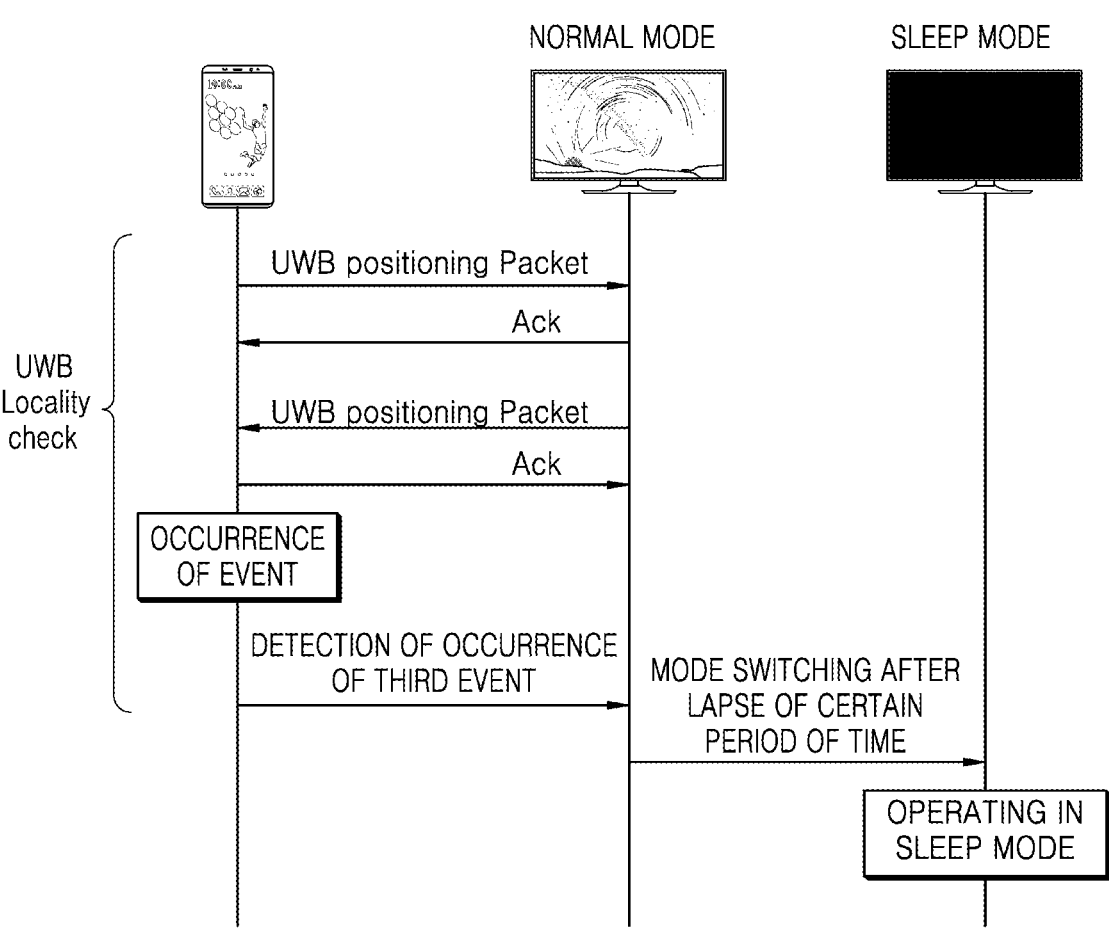
FIG. 13 is a diagram for describing a case where an electronic device detects a third event occurring in a user terminal, according to an example embodiment.

FIG. 13 is a diagram for describing a case where an electronic device detects a third event occurring in a user terminal, according to an embodiment.

Referring to FIG. 13, the electronic device may perform UWB communication with the user terminal while operating in the normal mode. The electronic device and the user terminal may each detect at least one of a position or coordinates, movement, and direction of a counterpart device by transmitting a UWB positioning packet to the counterpart device and receiving an ACK signal in response thereto from the counterpart device.

In an embodiment, the electronic device may identify whether the third event occurs in the user terminal while operating in the normal mode. The third event may include a case where a strength of a UWB signal received from the user terminal rapidly changes to a level less than or equal to a specific reference level. When the strength of the signal received from the user terminal rapidly changes to the level less than or equal to the reference level, the electronic device may additionally check whether another event occurs during a certain period of time. The electronic device may switch its mode from the normal mode to the second sleep mode when the strength of the signal received from the user terminal is less than or equal to the reference level and a certain period of time elapses without an additional event occurring after the occurrence of the third event.

Furthermore, when a certain period of time elapses without an additional event occurring even after switching to the second sleep mode, the electronic device may switch its mode from the second sleep mode to the first sleep mode so that only the BLE scan is performed.

In this way, according to an embodiment, the electronic device may prevent or reduce unnecessary power consumption by switching the operation mode when a network signal is not received from the user terminal or a magnitude of the network signal is reduced.

Figure 14:
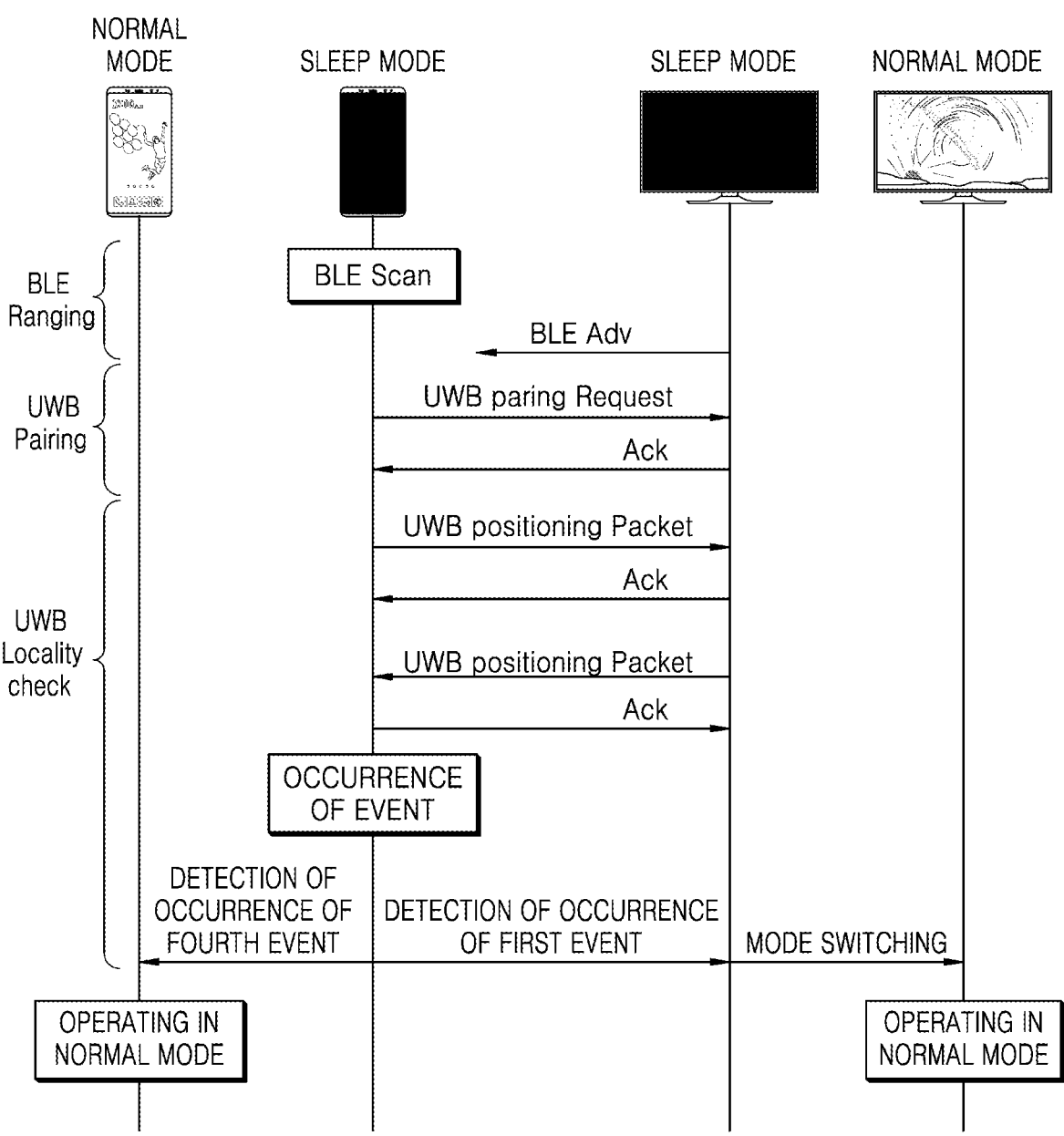
FIG. 14 is a diagram for describing a case where a user terminal detects occurrence of a fourth event, according to an example embodiment.

FIG. 14 is a diagram for describing a case where a user terminal detects occurrence of a fourth event, according to an embodiment.

Referring to FIG. 14, the electronic device and the user terminal may be both in the sleep mode. The electronic device and the user terminal may perform a BLE ranging process while operating in the sleep mode. The BLE ranging process may refer to a process in which a device transmits a BLE advertising packet to the surroundings at all times or periodically and a counterpart device scans for the BLE advertising packet.

After receiving a BLE advertising packet, the user terminal may identify that the electronic device can perform UWB communication by using a UWB session ID included in the BLE advertising packet and transmit a signal for UWB pairing to the electronic device. The electronic device may receive a UWB pairing request signal from the user terminal and transmit an ACK signal to the user terminal to thereby perform pairing with the user terminal.

Subsequently, the electronic device and the user terminal may each perform a UWB locality check to transmit UWB positioning packets between the electronic device and the user terminal and transmit ACK signals in response thereto therebetween.

In an embodiment, while operating in the sleep mode, the electronic device may detect that the first event has occurred in the user terminal. The first event may include a case in which the direction of the user terminal suddenly changes toward the electronic device, or the strength of a UWB signal received from the user terminal changes to greater than or equal to a reference level. When detecting that the first event has occurred in the user terminal, the electronic device may switch its mode from the sleep mode to the normal mode.

Also, in an embodiment, the user terminal may detect occurrence of an event in the user terminal as being the fourth event. The fourth event may include the first event. In an embodiment, the fourth event may include at least one of a change in a distance between the user terminal and the electronic device, a change in a direction of the user terminal, and a change in acceleration of the user terminal. The fourth event may further include a change in illuminance of the surroundings of the user terminal.

In an embodiment, when the user terminal detects at least one of a change in a direction of the user terminal, a change in acceleration of the user terminal, a change in illuminance, and a change in a distance to the electronic device by using a sensor mounted on the user terminal, the user terminal may identify that the fourth event has occurred therein, and accordingly, switch from the sleep mode to the normal mode.

As described above, according to an embodiment, the user terminal may detect a case where the fourth event occurs in the user terminal via a sensor, and in this case, the user terminal may automatically turn on and switch to the normal mode even when the user does not separately turn on the power of the user terminal, so that it may operate suitably to the user's intention.

Figure 15:
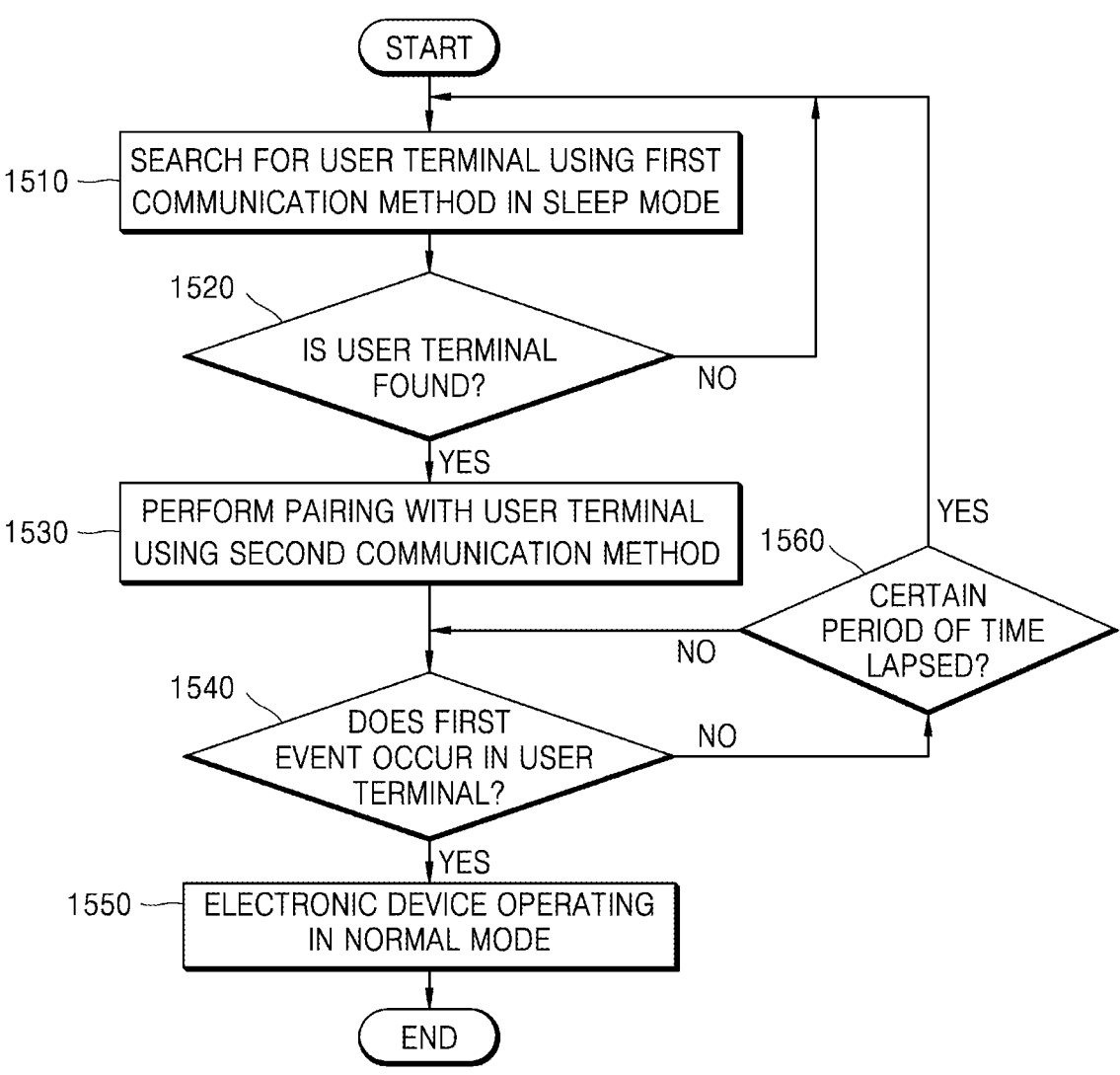
FIG. 15 is a flowchart of an operation method of an electronic device, according to an example embodiment.

FIG. 15 is a flowchart of an operation method of an electronic device, according to an embodiment.

Referring to FIG. 15, while operating in the sleep mode, the electronic device may search for a user terminal by using a first communication method (operation 1510). The first communication method may include a BLE communication method. The electronic device may include a BLE communication module, comprising communication circuitry, for performing BLE communication. The electronic device may transmit BLE signals to the surroundings. The user terminal may scan for the BLE signals. A BLE signal may include an ID of the electronic device and information notifying that the electronic device can perform UWB communication.

When the user terminal is found using the first communication method (operation 1520), the electronic device may perform pairing with the user terminal by using a second communication method (operation 1530). The second communication method may include a UWB communication method.

The user terminal may transmit a signal for UWB pairing to the electronic device by using an ID of the electronic device included in a BLE signal. The electronic device may perform pairing with the user terminal by receiving a UWB pairing signal from the user terminal and transmitting an ACK signal to the user terminal in response thereto.

After performing pairing with the user terminal 220, the electronic device may transmit and receive signals to and from the user terminal by using UWB communication. The electronic device may include a UWB communication module for performing UWB communication. The UWB communication module may include a plurality of antennas.

While performing UWB communication, the electronic device may determine whether a first event has occurred in the user terminal (operation 1540). In an embodiment, the first event may include at least one of a rapid change in a strength of a signal received from the user terminal via the antennas included in the UWB communication module and a rapid change in a direction of the user terminal.

When a strength of a signal received from the user terminal suddenly increases or a direction of the user terminal suddenly changes toward the electronic device, the electronic device may detect the occurrence of the first event and switch from the sleep mode to the normal mode to operate (operation 1550).

While performing UWB communication, when the first event does not occur in the user terminal for a certain period of time (operation 1560), the electronic device may stop performing the UWB communication and perform BLE communication again to search for another user terminal.

Figure 16:
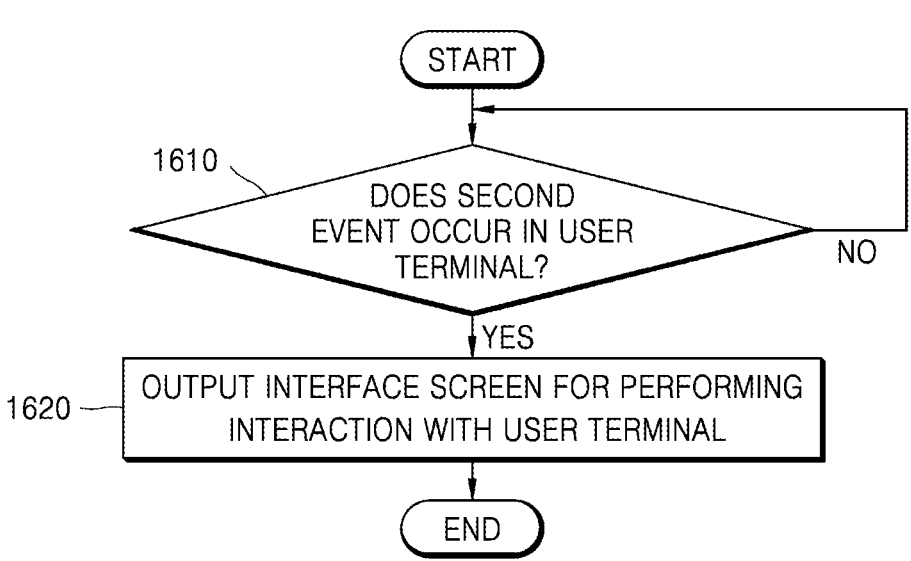
FIG. 16 is a flowchart of an operation method of an electronic device, according to an example embodiment.

FIG. 16 is a flowchart of an operation method of an electronic device, according to an embodiment.

The electronic device may perform UWB pairing with a user terminal and then perform UWB communication therewith. While operating in the normal mode, the electronic device may determine whether a second event has occurred in the user terminal (operation 1610). In an embodiment, the second event may include at least one of a rapid change in a strength of a signal received from the user terminal via a plurality of antennas included in a UWB communication module and a rapid change in a direction of the user terminal.

When detecting a rapid change in a position of the user terminal or a signal strength, or a rapid change in a direction of the user terminal, the electronic device may output an interface screen for performing an interaction with the user terminal (operation 1620).

Figure 17:
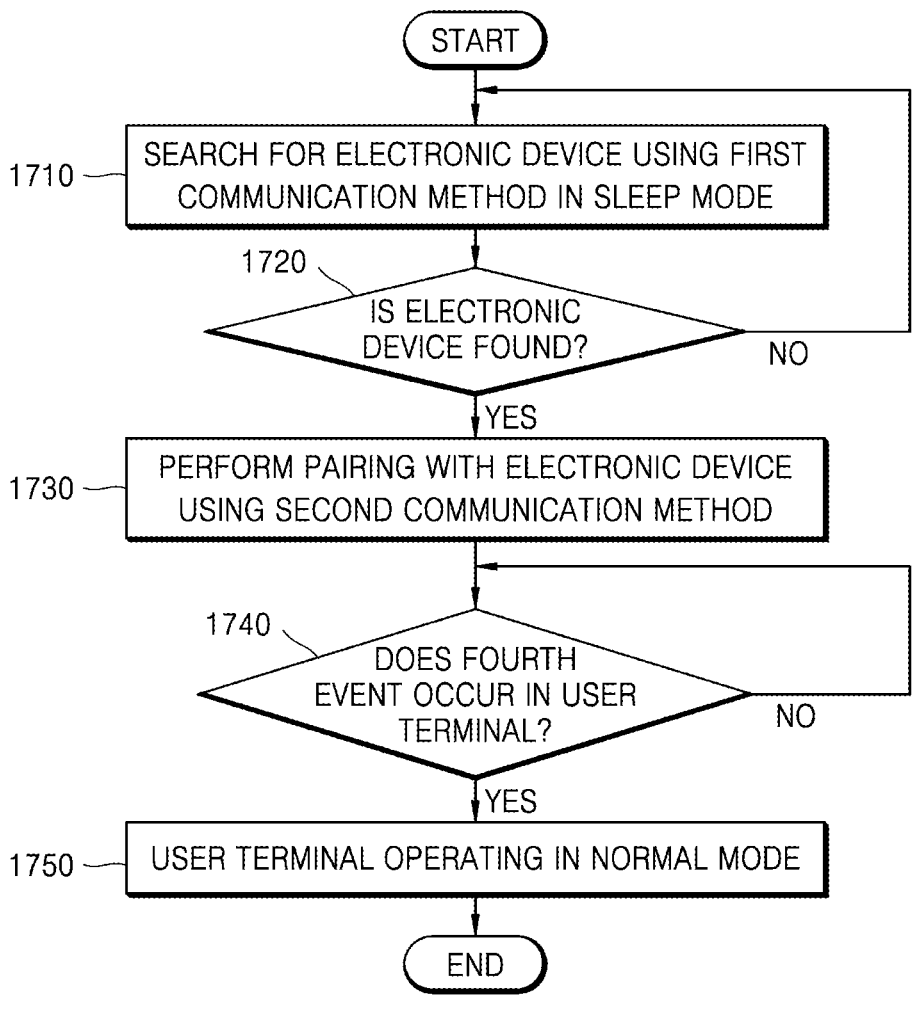
FIG. 17 is a flowchart of an operation method of a user terminal, according to an example embodiment.

FIG. 17 is a flowchart of an operation method of a user terminal, according to an embodiment.

Referring to FIG. 17, the user terminal may operate in the sleep mode. In the sleep mode, the user terminal may search for an electronic device by using a first communication method (operation 1710). The first communication method may include a BLE communication method.

When the electronic device is found using the first communication method (operation 1720), the user terminal may perform pairing with the electronic device by using a second communication method (operation 1730). The second communication method may include a UWB communication method.

While communicating with the electronic device, the user terminal may detect whether a fourth event has occurred in the user terminal (operation 1740). In an embodiment, the fourth event may include at least one of a change in a direction of the user terminal, a change in a position thereof, a change in acceleration thereof, a change in illuminance of the surroundings thereof. The user terminal may detect whether the fourth event has occurred by using at least one of an illuminance sensor, a magnetic sensor, a gyroscope sensor, a position sensor, a proximity sensor, and an acceleration sensor installed in the user terminal.

When detecting that the fourth event has occurred, the user terminal may switch from the sleep mode to the normal mode (operation 1750).

An electronic device and operation method thereof according to some embodiments may be implemented in the form of recording media including instructions executable by a computer, such as a program module executed by the computer. The computer-readable recording media may be any available media that are accessible by the computer, and include both volatile and non-volatile media and both removable and non-removable media. Furthermore, the computer-readable recording media may include computer storage media and communication media. The computer storage media include both volatile and non-volatile and both removable and non-removable media implemented in any method or technology for storage of information, such as computer-readable instructions, data structures, program modules, or other data. The communication media typically embody computer-readable instructions, data structures, program modules, other data in a modulated data signal such as a carrier wave, or other transmission mechanism, and include any information transmission media.

Also, in this specification, the term "unit" may be a hardware component such as a processor or circuit, and/or a software component executed by a hardware component such as a processor.

Furthermore, the electronic device and operation method thereof according to example embodiments may be implemented as a computer program product including a computer-readable recording medium having recorded thereon a program for realizing the operation method of the electronic device, including searching for a user terminal using a first communication method in a sleep mode, performing, in response to discovery of the user terminal, pairing with the user terminal by using a second communication method, identifying whether a first event occurs in the user terminal by using the second communication method, and switching from the sleep mode to a normal mode when identifying that the first event has occurred in the user terminal, wherein only a communication function of the electronic device is activated in the sleep mode, and the electronic device is normally activated in the normal mode to operate.

The above description is provided for illustration, and it will be understood by one of ordinary skill in the art that changes in form and details may be readily made therein without departing from technical idea or essential features of the disclosure. Accordingly, the above-described embodiments and all aspects thereof are merely examples and are not limiting. For example, each component defined as an integrated component may be implemented in a distributed fashion, and likewise, components defined as separate components may be implemented in an integrated form.

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. An operation method of an electronic device, the operation method comprising:

searching for a user terminal at least by using a first communication method in a sleep mode of the electronic device;

performing, in response to discovery of the user terminal via said searching, pairing with the user terminal at least by using a second communication method in the sleep mode of the electronic device;

after performing the pairing with the user terminal and while the electronic device is in the sleep mode, identifying whether a first event has occurred in the user terminal at least by using the second communication method; and switching from the sleep mode to a normal mode of the electronic device based on identifying that the first event has occurred in the user terminal, wherein the first event comprises at least one of: a change in a direction of the user terminal or a change in acceleration of the user terminal.

2. The operation method of claim 1, wherein the first communication method is a Bluetooth Low Energy (BLE) communication method, and the second communication method is an ultra-wideband (UWB) communication method.

3. The operation method of claim 2, wherein the electronic device comprises a UWB communication module including a plurality of antennas, and the plurality of antennas comprise at least two receive (RX) antennas and at least one transmit (TX)/RX antenna, and at least one antenna is arranged in vertical and horizontal directions on a front side of a display of the electronic device and configured to detect at least one of a location and a direction of the user terminal.

4. The operation method of claim 3, further comprising:

identifying whether another event occurs in the user terminal in the normal mode; and identifying that the other event has occurred in the user terminal and switching from the normal mode to the sleep mode when no event is detected for a certain period of time after the occurrence of the other event, wherein the other event comprises a case where a strength of a signal received from the user terminal via the plurality of antennas included in the UWB communication module is less than or equal to a certain reference value.

5. The operation method of claim 3, further comprising:

identifying whether a second event occurs in the user terminal in the normal mode; and when identifying that the second event has occurred in the user terminal, outputting, onto the display, an interface screen for performing an interaction with the user terminal.

6. The operation method of claim 5, wherein the second event comprises at least one of: a change in a strength of a signal received from the user terminal via the plurality of antennas included in the UWB communication module, and a change in the direction of the user terminal.

7. The operation method of claim 1, wherein the sleep mode comprises a first sleep mode and a second sleep mode, the searching for the user terminal at least by using the first communication method is performed in the first sleep mode, the performing of the pairing with the user terminal at least by using the second communication method is performed in the second sleep mode, and the operation method further comprises, after the performing of the pairing, switching the electronic device from the second sleep mode to the first sleep mode when the electronic device fails to identify that the first event has occurred in the user terminal for a predetermined period of time.

8. The operation method of claim 1, wherein the sleep mode of the electronic device includes a mode in which power is supplied to a communicator of the electronic device including a first communication circuitry configured to use the first communication method and a second communication circuitry configured to use the second communication method and restricted to other component of the electronic device, and the normal mode of the electronic device includes a mode in which power is made available to all components of the electronic device.

9. The operation method of claim 1, wherein the first communication method includes using Bluetooth Low Energy (BLE) communication, the second communication method includes using ultra-wideband (UWB) communication network, and the method further comprises:

based on the first event not occurring for a set period of time after performing the pairing with the user terminal, deactivating the pairing with the user terminal using the second communication method and searching for a user terminal by using the first communication method.

10. An operation method of a user terminal, the operation method comprising:

searching for an electronic device at least by using a first communication method in a sleep mode of the user terminal;

performing, in response to discovery of the electronic device via said searching, pairing with the electronic device at least by using a second communication method in the sleep mode of the electronic device; and switching from the sleep mode to a normal mode of the user terminal based on detecting that a sensing event occurs in the user terminal in the sleep mode, wherein the sensing event comprises at least one of: a change in illuminance of surroundings of the user terminal, a change in a direction of the user terminal, and a change in acceleration of the user terminal.

11. The operation method of claim 10, wherein the user terminal comprises at least one of an illuminance sensor, a magnetic sensor, a gyroscope sensor, a position sensor, a proximity sensor, and an acceleration sensor, and the method comprises detecting of the sensing event comprises detecting whether the sensing event has occurred at least by using at least one of the sensors.

12. An electronic device comprising:

at least one processor comprising processing circuitry; and a communicator including a first communication module and a second communication module, each said communication module comprising circuitry;

wherein the at least one processor and/or the communicator is individually and/or collectively configured to:

in a sleep mode of the electronic device, search for a user terminal at least by using the first communication module, perform, in response to discovery of the user terminal based on the search, pairing with the user terminal at least by using the second communication module in the sleep mode of the electronic device, after performing the pairing with the user terminal and while in the sleep mode, identify whether a first event has occurred in the user terminal at least by using the second communication module, and cause the electronic device to switch from the sleep mode to a normal mode of the electronic device based on identifying that the first event has occurred in the user terminal, wherein the first event comprises at least one of: a change in a direction of the user terminal or a change in acceleration of the user terminal.

13. The electronic device of claim 12, wherein the first communication module is a Bluetooth Low Energy (BLE) communication module comprising communication circuitry, and the second communication module is an ultra-wideband (UWB) communication module comprising communication circuitry.

14. The electronic device of claim 13, further comprising a display, wherein the UWB communication module comprises a plurality of antennas including at least two receive (RX) antennas and at least one transmit (TX)/RX antenna, and at least one antenna is arranged in vertical and horizontal directions on a front side of the display to detect at least one of a location and a direction of the user terminal.

15. The electronic device of claim 14, wherein the at least one processor is configured to, when identifying that a another event has occurred in the user terminal in the normal mode via the communicator, in response to no event being detected for a certain period of time after the occurrence of the other event, control the electronic device to switch from the normal mode to the sleep mode, and the other event comprises a case where a strength of a signal received from the user terminal via the plurality of antennas included in the UWB communication module is less than or equal to a certain reference value.

16. The electronic device of claim 12, wherein the at least one processor is configured to identify whether a second event occurs in the user terminal in the normal mode, and when identifying that the second event has occurred in the user terminal in the normal mode via the communicator, control a display to output an interface screen for performing an interaction with the user terminal.

17. The electronic device of claim 16, wherein the second event comprises at least one of:

a change in a strength of a signal received from the user terminal via a plurality of antennas included in the second module, and a change in a direction of the user terminal.

18. The electronic device of claim 12, wherein the sleep mode comprises a first sleep mode and a second sleep mode, the searching for the user terminal at least by using the first communication module is performed in the first sleep mode, the performing of the pairing with the user terminal at least by using the second communication module is performed in the second sleep mode, and wherein the at least one processor is configured to, after the performing of the pairing, switch the electronic device from the second sleep mode to the first sleep mode when the electronic device fails to identify that the first event has occurred in the user terminal for a predetermined period of time.

* * * * *